(12) United States Patent
Kikuchi et al.

(10) Patent No.: US 8,871,345 B2
(45) Date of Patent: Oct. 28, 2014

(54) METHOD FOR PRODUCING COMPOSITE PELLET FOR EXTRUSION MOLDING, AND COMPOSITE PELLET FOR EXTRUSION MOLDING PRODUCED BY THE METHOD

(75) Inventors: Takeyasu Kikuchi, Tokyo (JP); Kazumasa Morita, Tokyo (JP); Koji Higashi, Tokyo (JP); Yuichiro Nakamura, Tokyo (JP)

(73) Assignee: WPC Corporation, Tokyo (JP)

( * ) Notice: Subject to any disclaimer, the term of this patent is extended or adjusted under 35 U.S.C. 154(b) by 0 days.

(21) Appl. No.: 13/641,536

(22) PCT Filed: Apr. 27, 2011

(86) PCT No.: PCT/JP2011/060269
§ 371 (c)(1),
(2), (4) Date: Oct. 16, 2012

(87) PCT Pub. No.: WO2011/136273
PCT Pub. Date: Nov. 3, 2011

(65) Prior Publication Data
US 2013/0065053 A1  Mar. 14, 2013

Related U.S. Application Data

(63) Continuation-in-part of application No. PCT/JP2010/065310, filed on Sep. 7, 2010, which is a continuation-in-part of application No. PCT/JP2010/070281, filed on Nov. 15, 2010.

(30) Foreign Application Priority Data

Apr. 28, 2010 (JP) ................................. 2010-104279
Jun. 22, 2010 (JP) ................................. 2010-141901

(51) Int. Cl.
*B32B 5/16* (2006.01)
(52) U.S. Cl.
USPC ........ 428/402; 428/403; 428/407; 264/176.1; 264/177.1
(58) Field of Classification Search
USPC ............... 428/402, 326, 403, 407; 264/176.1, 264/177.1
See application file for complete search history.

(56) References Cited

U.S. PATENT DOCUMENTS 5,773,138 A * 6/1998 Seethamraju et al. ........ 428/326

FOREIGN PATENT DOCUMENTS

| EP | 0747419 A2 | 12/1996 |
|---|---|---|
| EP | 747419 | * 2/1997 |
| EP | 2450174 A1 | 5/2012 |
| JP | 07-247318 | 9/1995 |
| JP | 07-266313 | 10/1995 |
| JP | 9-48023 | * 2/1997 |
| JP | 09-048023 | 2/1997 |
| JP | 10-166355 | 6/1998 |
| JP | 10-330500 | 12/1998 |
| JP | 2001-062901 | 3/2001 |
| JP | 2001-129870 | 5/2001 |
| JP | 2001-205627 | 7/2001 |
| JP | 2002-326219 | 11/2002 |
| JP | 2003-220607 | 8/2003 |
| JP | 2003-266431 | 9/2003 |
| JP | 2008-233291 | 10/2008 |
| JP | 2010-030176 | 2/2010 |
| JP | 2011-012183 | 1/2011 |
| JP | 4436435 B1 | 1/2011 |
| WO | 03076147 A1 | 9/2003 |
| WO | WO2009144887 A1 | 12/2009 |
| WO | 2011135745 A1 | 11/2011 |
| WO | 2011161838 A1 | 12/2011 |

OTHER PUBLICATIONS

International Search Report for PCT/JP2011/060269, dated May 31, 2011.
European Search Report, dated Sep. 12, 2013.

* cited by examiner

*Primary Examiner* — Leszek Kiliman
(74) *Attorney, Agent, or Firm* — Cooper Legal Group, LLC

(57) ABSTRACT

Disclosed are composite pellets for extrusion molding wherein fusion does not occur between the pellets, and there is no variation in size and density. A molten material obtained by an extruder for a raw material containing a thermoplastic resin and wood powder is extruded into a strand shape through a die nozzle of the extruder, and cut into a predetermined length to form a pellet. At this time, the extrusion amount, the diameter of each nozzle hole, and the number of nozzle holes are adjusted so that the linear velocity (vd) of the molten material in each nozzle hole of the die nozzle is in the range of 12 to 50 cm/sec. Further, regardless of the variations in particle diameter, etc., a stable amount of the composite pellets are supplied to the extruder, and smoothly introduced to a screw of the extruder. The composite pellets and 12-hydroxystearic acid containing a metal of Ca, Mg, or Zn are agitated together, and 0.03 to 0.4 mass % of the 12-hydroxystearic acid is attached to the periphery of 100 mass % of the composite pellet, and the pellets are used for extrusion molding.

27 Claims, 23 Drawing Sheets

METHOD FOR PRODUCING COMPOSITE PELLET FOR EXTRUSION MOLDING, AND COMPOSITE PELLET FOR EXTRUSION MOLDING PRODUCED BY THE METHOD

TECHNICAL FIELD

The present invention relates to a method of manufacturing composite pellets that are extruded into synthetic wood products obtained by molding thermoplastic resins containing a large amount of wood meal and to the composite pellets manufactured by this method. The present invention also relates to a method of manufacturing composite pellets for extrusion that are produced by melt-kneading, compounding, and granularizing thermoplastic resins, wood meal, and other secondary materials added in advance as required (pellets produced by compounding two or more of such different types of raw materials are referred to as "composite pellets" in this specification) that are required to extrude into synthetic wood products; and that are suitable particularly for application to extrusion foaming, as well as to composite pellets for extrusion that are manufactured by the above-described method. The present invention also relates to composite pellets for extrusion that exhibit stable supply to extruders and improved ease of introduction to extruders (clingability to extruder screws) and to a processing method that endows composite pellets for extrusion with the above-described characteristics.

BACKGROUND OF THE INVENTION

The synthetic wood products produced by extruding molding materials obtained by melt-kneading thermoplastic resin, wood meal, and other secondary materials added as required into a desired shape have characteristics of resin moldings, such as resistance to decomposition while having their wood textures. Accordingly, the synthetic wood products are widely used, for example, as building materials for wood decks that are installed outdoors after being processed into boards or the like.

In the manufacturing of such synthetic wood products, thermoplastic resin, wood meal, and other secondary materials cannot be extruded satisfactorily if delivered directly into the cylinder of the extruder provided in an extrusion apparatus for manufacturing synthetic wood products because pyroligneous acid or moisture contained in the wood meal produces a large amount of gas in the cylinder of the extruder.

Furthermore, even without such occurrence of gas, a large extruder will be necessary if an attempt is made to melt-knead thermoplastic resin, wood meal, and other secondary materials until they are uniformly distributed.

For this reason, raw materials are usually not delivered directly into an extruder when synthetic wood products are to be manufactured. Instead, raw materials are kneaded and compounded in advance, then the compounded raw materials are granularized into pellets (pellets produced by compounding two or more different types of raw materials are referred to as "composite pellets" throughout the present invention), and finally the composite pellets obtained in this manner are used as molding materials to be extruded into synthetic wood products.

As one example of a method for manufacturing such composite pellets, there is proposed a method of manufacturing in a batch composite pellets used to extrude into synthetic wood products, where wood meal is dried and pyroligneous acid gases are volatilized using heat generated at the time of stirring with a Henschel mixer; kneaded materials are produced by melt-kneading the raw materials; granularized materials with a certain grain size are produced by stirring these kneaded materials while being cooled with a cooling mixer; and then the granularized materials are further crushed into smaller pieces with a cutter mill (refer to Patent Document 1).

Because batch manufacturing methods, as described above, have low productivity, there is also proposed another example of a method of manufacturing chip-shaped or pellet-shaped extrusion molding materials by introducing into a die kneaded materials extruded by an extruder to mold the materials into a sheet or strand (circular belt) shape and then cutting the extruded sheet-shaped or strand-shaped kneaded materials.

In this kind of manufacturing of extrusion molding materials with an extruder, because a large amount of gas is produced in the cylinder of the extruder due to pyroligneous acid or moisture contained in wood meal, pre-kneading with the extruder is proposed for example, by providing a vent hole in the cylinder of the extruder and sucking the gases produced in the cylinder via this vent hole (Patent Documents 2 to 5).

RELATED ARTS

Patent Documents

Patent Document 1: Japanese Patent KOKAI (LOPI) No. H7-266313
Patent Document 2: Japanese Patent KOKAI (LOPI) No. H10-166355
Patent Document 3: Japanese Patent KOKAI (LOPI) No. 2001-62901
Patent Document 4: Japanese Patent KOKAI (LOPI) No. 2001-129870
Patent Document 5: Japanese Patent KOKAI (LOPI) No. 2002-326219

SUMMARY OF THE INVENTION

Problem to be Solved by the Invention

As described above, in the manufacturing of synthetic wood products, pre-kneading for uniformly melt-kneading raw materials and granularization for forming the pre-kneaded molten materials into pellets are performed as pre-processing, and composite pellets produced in this manner are used as molding materials to manufacture synthetic wood products. The characteristics or nature imparted to the composite pellets during these pre-kneading process and granularization process greatly affect the processability in the molding process performed using these composite pellets and the quality of the finally obtained synthetic wood products.

Composite pellets pre-kneaded in this manner are used as molding materials when synthetic wood products are to be manufactured to prevent the synthetic wood products from becoming defective due to uneven distribution of constituents therein.

Here, the requirements for composite pellets used to manufacture synthetic wood products are that individual grains of pellets should be separated from and independent of one another (grains of pellets should not adhere to one another) and that the physical properties, such as the shape, size, and density, of the pellets should be uniform over the pellets. Furthermore, composite pellets need to be manufactured such that molding materials in a state of a large number of gathered pellets, in short, an aggregate of pellets, can have a predetermined bulk density (e.g., such that appropriate gaps can be formed between pellets when stacked upon one another).

For this purpose, the manufacturing of such composite pellets needs to be correctly controlled so that individual pellets have a predetermined shape, size, density, and so forth.

If synthetic wood products are manufactured by extrusion using composite pellets that do not satisfy even one of the above-described requirements, composite pellets, as well as molten materials resulting from the composite pellets being melted, will not flow stably and uniformly in the extruder, leading to a higher percentage of the resultant synthetic wood products being defective.

Particularly when composite pellets are delivered into the cylinder of the extruder together with foaming agents to perform extrusion foam molding, foaming gases will not be uniformly distributed in the molten materials, thus making it difficult to control foaming. This causes foaming gases to distribute unevenly and voids to be formed in the synthetic wood products, resulting in a higher percentage of the synthetic wood products being defective.

Moreover, a test by the inventors of the present invention confirmed that in a case where extrusion foam molding is performed using composite pellets that do not meet the above-described conditions, it is difficult to manufacture lightweight synthetic wood products because it is difficult to decrease the specific gravity by adding a foaming agent, compared with a case where extrusion foam molding is performed using composite pellets that meet the above-described conditions. For this reason, when extrusion foam molding is to be performed using composite pellets that do not meet the above-described requirements, it becomes necessary to add a large amount of foaming agent, which increases the manufacturing cost.

Although composite pellets used to manufacture synthetic wood products need to satisfy the above-described requirements, the shape, size, and so forth of individual composite pellets manufactured by performing pre-kneading and granularization with, for example, a Henschel mixer, a cooling mixer, and a cutter, as described in Patent Document 1, cannot be exactly controlled and therefore vary greatly among the composite pellets.

In addition, due to high frictional resistance of composite pellets containing a large amount of wood meal etc., as described above, not only is it difficult to supply a stable amount of composite pellets to an extruder, but also the composite pellets after having entered the extruder exhibit low ease of introduction (so-called "clingability") to the tooth grooves of the screw. Because variations of the amount of clinging pellets cause the amount of molten resin extruded to vary, the quality of the resultant synthetic wood products easily varies, accordingly.

While it is difficult to manufacture composite pellets with stable and uniform grain size as described above, a change in grain size of composite pellets greatly affects the amount of composite pellets supplied to the extruder and the clingability to the above-described screw. Thus, if the grain size of composite pellets to be used changes, time-consuming adjustment work becomes necessary, such as changing the settings of the feeder for supplying composite pellets to the extruder, the settings of the motor that rotates the screw of the extruder, and so forth.

In addition, if the shape, size, and so forth of individual composite pellets are not constant, it is also difficult to control the bulk density of molding materials in the form of an aggregate of composite pellets to be a predetermined value.

On the other hand, with the methods described in Patent Documents 2 to 5, in which pellets or chips are manufactured by melt-kneading raw materials using an extruder for pre-kneading, extruding the molten materials into a strand or sheet shape with a die nozzle mounted at the front end of this extruder, and then cutting the strands or sheets of the extruded molten materials at intervals of a predetermined length, composite pellets of a constant shape and size can be produced, provided that composite pellets of the size and shape equivalent to the sizes and shapes of the nozzle holes formed in the die can be produced.

However, when molten materials melt-kneaded with the extruder in this manner are extruded into a strand shape through the die nozzles, the molten materials extruded through the nozzle holes of the die nozzle inflate due to the Barus effect as soon as they exit the nozzle holes.

As a result, this inflation causes the strands extruded through adjacent nozzle holes to come close to one another and therefore be likely to come into contact with one another. Thus, when cut to produce pellets, these strands are likely to form a mass of pellets adhering to one another.

In addition, as a result of the strands that have exited the nozzle holes inflating in this manner, it becomes difficult to ensure that the pellets obtained by cutting these strands have a predetermined thickness or length, and furthermore, it is also difficult to set the bulk density of the molding materials in the form of an aggregate of pellets so as to fall within a predetermined value range.

Consequently, when synthetic wood products are to be formed using composite pellets obtained in this manner, stable and uniform flow is difficult to achieve in the extruder, leading to a higher percentage of the resultant synthetic wood products being defective. Particularly in the case of extrusion foam molding, foaming cannot be controlled easily because foaming gases cannot be uniformly distributed, which causes voids to be formed easily in the molded article.

In light of these circumstances, the present invention is intended to solve problems in the above-described related art, and an object thereof is to provide composite pellets for extrusion with the following characteristics when those composite pellets are manufactured by melt-kneading raw materials, containing thermoplastic resin and wood meal as main raw materials, with an extruder and extruding the raw materials into a strand shape through die nozzles and then by cutting the strands extruded in this manner to a predetermined length to granularize the strands; i.e., those composite pellets that can easily provide a stable and uniform flow of molten materials in the extruder, exhibit a decreased percentage of defective synthetic wood products, easily control foaming by uniformly distributing foaming gases particularly in extrusion foam molding, and prevent a void from occurring in a molded article by providing a method of manufacturing composite pellets that do not adhere to one another, are free from variations in shape, size, density, and so forth, and the diameters of which can be obtained below the diameters of the nozzle holes by suppressing inflation due to the Barus effect, and are easily able to be used in such a way as to control the bulk density of the molding materials.

Another object of the present invention is to provide a method of manufacturing composite pellets containing thermoplastic resin and wood meal as main raw materials, in which a stable amount of pellets can be supplied to the extruder without having to change the setting of the feeder even when the grain size etc. of the composite pellets change, the composite pellets for extrusion exhibit superior clingability to a screw, and the composite pellets for extrusion have the above-described characteristics.

Means for Solving the Problems

The means for solving the problems will now be described with reference to the numerals used in the embodiments.

These reference numerals are intended to clarify the correspondence between the descriptions in the Claims and the descriptions in the embodiments of the present invention, and it is needless to say that these reference numerals are not limited in use to interpreting the technical scope of the Claims of the present invention.

In order to solve the above-described problems, the present invention provides a method of manufacturing composite pellets for extrusion in which the composite pellets are used as a molding material extruded into a synthetic wood product containing a thermoplastic resin and wood meal as main ingredients, comprising:

when the composite pellets are formed by extruding a molten material obtained by melt-kneading a raw material containing thermoplastic resin and wood meal with an extruder 42 into a strand shape through many nozzle holes 43a provided in a die nozzle 43 mounted at a front end of the extruder 42, then cutting strands of the molten material at intervals of a predetermined length, setting the rate of extrusion (Q) of the extruder 42, the diameter (D) of each of the nozzle holes 43a, and the number (n) of the nozzle holes 43a such that a linear velocity (vd) falls within a range of 12 to 50, wherein vd=(Q×1000/3600)/[(D/20)$^2$·π·ρm·n], where vd=linear velocity (cm/sec), Q=rate of extrusion by the extruder (kg/Hr),
D=diameter of each nozzle hole (mm).
n=number of nozzle holes, and
ρm=density of molten resin (g/cm$^3$).

In the method, the pellets may be stirred together with metal salt of 12-hydroxystearic acid to deposit the metal salt of 12-hydroxystearic acid on surfaces of the pellets.

Further, in the method, 0.03 to 0.4 mass % of the metal salt of 12-hydroxystearic acid relative to the composite pellets as 100 mass % may be deposited on the composite pellets.

Preferably, in the method, a compounding ratio of the wood meal to the thermoplastic resin is 70-30 mass % to 30-70 mass %.

Moreover, in the method, the molten material is introduced into the nozzle holes 43a at 170 to 250° C., more preferably 200 to 230° C.

Preferably, the strands of the molten material are cut to a length of 2 to 5 mm.

Furthermore, composite pellets for extrusion according to the present invention is the composite pellets manufactured by any of the above-described methods.

The composite pellets according to the present invention may be singularly used, however, the composite pellets may be used as a molding material for extrusion foam molding in which the molding material is delivered together with a foaming agent into a cylinder of the extruder provided in an extrusion apparatus for extruding into a synthetic wood product.

The pellets may contain a thermoplastic resin and wood meal as main ingredients and have metal salt of 12-hydroxystearic acid deposited as an additive on outer circumferences thereof.

Moreover, preferably, 0.03 to 0.4 mass % of the metal salt of 12-hydroxystearic acid relative to the pellets as 100 mass % is deposited on the composite pellets.

The metal salt of 12-hydroxystearic acid may contain any of calcium (Ca), magnesium (Mg) or zinc (Zn) as metal.

Furthermore, the metal contained in the metal salt of 12-hydroxystearic acid may include any of aluminum (Al), barium (Ba), lithium (Li), or sodium (Na).

Preferably, the composite pellets have a bulk density of 0.60 g/cm$^3$ or more when placed in a container with a predetermined capacity in a nonpressurized state.

Preferably, the compounding ratio of the thermoplastic resin to the wood meal is 70-30 mass % to 30-70 mass %.

Moreover, the thermoplastic resin may be composed of one or both of polypropylene and polyethylene.

The thermoplastic resin may be waste plastic collected in a mixed state of two or more types of thermoplastic resins.

Preferably, the thermoplastic resin has a melt index (MI) within a range of 0.5 to 10 (g/10 min).

The wood meal may be composed of a waste material including a waste building material or sawdust greatened during wood processing.

Preferably, the grain size of the wood meal is within a range of 150 to 200 μm.

Preferably, the wood meal has a water content of 1 mass % or less.

Effect of the Invention

With the structure of the present invention described above, the method of manufacturing composite pellets according to the present invention and composite pellets manufactured by the same method can bring about the following effects.

Not only can the strands of molten materials that have passed through the nozzle holes 43a of the die nozzle 43 be prevented from inflating due to the Barus effect, but also the diameters of the strands can be controlled below the diameters D of the nozzle hole 43a by extruding the strands of molten resin at the above-described linear velocity vd.

Because the strands do not inflate in this manner, the strands extruded through the adjacent nozzle holes 43a can be prevented from coming into contact with one another, thereby making it possible to satisfactorily prevent the pellets from adhering to one another.

In addition, it becomes easy to manufacture pellets having a substantially constant diameter smaller than the diameters of the nozzle holes 43a by cutting the strands produced in this manner to a predetermined length. The bulk density of the molding materials can be easily increased to more than a predetermined value, for example, 0.68 g/cm$^3$ by making the sizes of individual pellets small. Furthermore, the strands are prevented from inflating, making the shapes thereof constant. As a result, individual pellets obtained by cutting those strands can easily have constant sizes, shapes, and densities, and so forth.

Furthermore, as a result of individual pellets being prevented from adhering to one another in this manner and composite pellets with a constant size, shape, density, and so forth being produced, molten materials can flow stably and uniformly in the extruder, when the produced composite pellets are extruded into synthetic wood products such as deck materials. This can decrease the percentage of the resultant synthetic wood products being defective.

Particularly when composite pellets manufactured by the method of the present invention are used as molding materials for extrusion foam molding, in which the composite pellets are delivered into the extruder together with foaming agents, foaming is so easily controlled that voids resulting from the uneven distribution of foaming gases can be satisfactorily prevented from occurring in the synthetic wood products by uniformly distributing foaming gas in the molten materials. As a result, the percentage of defective wood molded foam, which is prone to manufacturing errors, can be decreased.

In addition, in a case where composite pellets manufactured by the method of the present invention are used for the above-described extrusion foam molding, wood molded foams with a low specific gravity, i.e., lightweight wood molded foams can be manufactured using a relatively small amount of foaming agent.

The above-described effects of the present invention can also be brought about with a higher content of wood meal, i.e., under the condition where the compounding ratio of thermoplastic resin to wood meal is 30-70 mass %:70-30 mass %.

Furthermore, with a structure in which the above-described molten resin is introduced into the nozzle holes 43a at temperatures of 170 to 250° C., preferably at temperatures of 200 to 230° C., the strands extruded through the nozzle holes 43a can be prevented from inflating.

When the above-described strands of molten resin are cut to a length of 2 to 5 mm, the adjacent strands do not adhere to one another easily at the time of cutting, thus preventing the pellets produced by cutting those strands from adhering to one another easily.

In addition, in a case where the strands are cut to a larger length, and therefore, the resultant pellets have a larger length, the pellets are easily deformed, such as being bent in the length direction, causing the shapes of the pellets to vary easily. When the strands are cut to the above-described length, such deformation of pellets can be prevented, and pellets with a substantially uniform shape can be produced.

Furthermore, according to the composite pellets for extrusion of the present invention with the above-described structure of the present invention, even in a case, for example, where the grain sizes of the composite pellets to be used vary, not only can the amount of composite pellets supplied to the extruder be made constant, but also the clingability to the screw can be increased without having to adjust the supply feeder or the extruder.

As a result, even when the qualities, particularly the sizes, of the manufactured composite pellets are not uniform as a result of the manufacturing of the composite pellets, performed as pre-processing before extrusion into synthetic wood products, the molten resin can be discharged stably and smoothly with the extruder, allowing the produced synthetic wood products to have stable and uniform quality.

In addition, as a result of the clingability of pellets to the screw being increased, the energy necessary to extrude a given weight of molten resin can be decreased, allowing synthetic wood products to be manufactured with a smaller amount of energy.

Objects and advantages of the present invention can be understood through detailed explanation of the following preferred embodiments with reference to the attached drawings showing reference numerals that denote corresponding constituent members.

MODE FOR CARRYING OUT THE INVENTION

Figure 1:
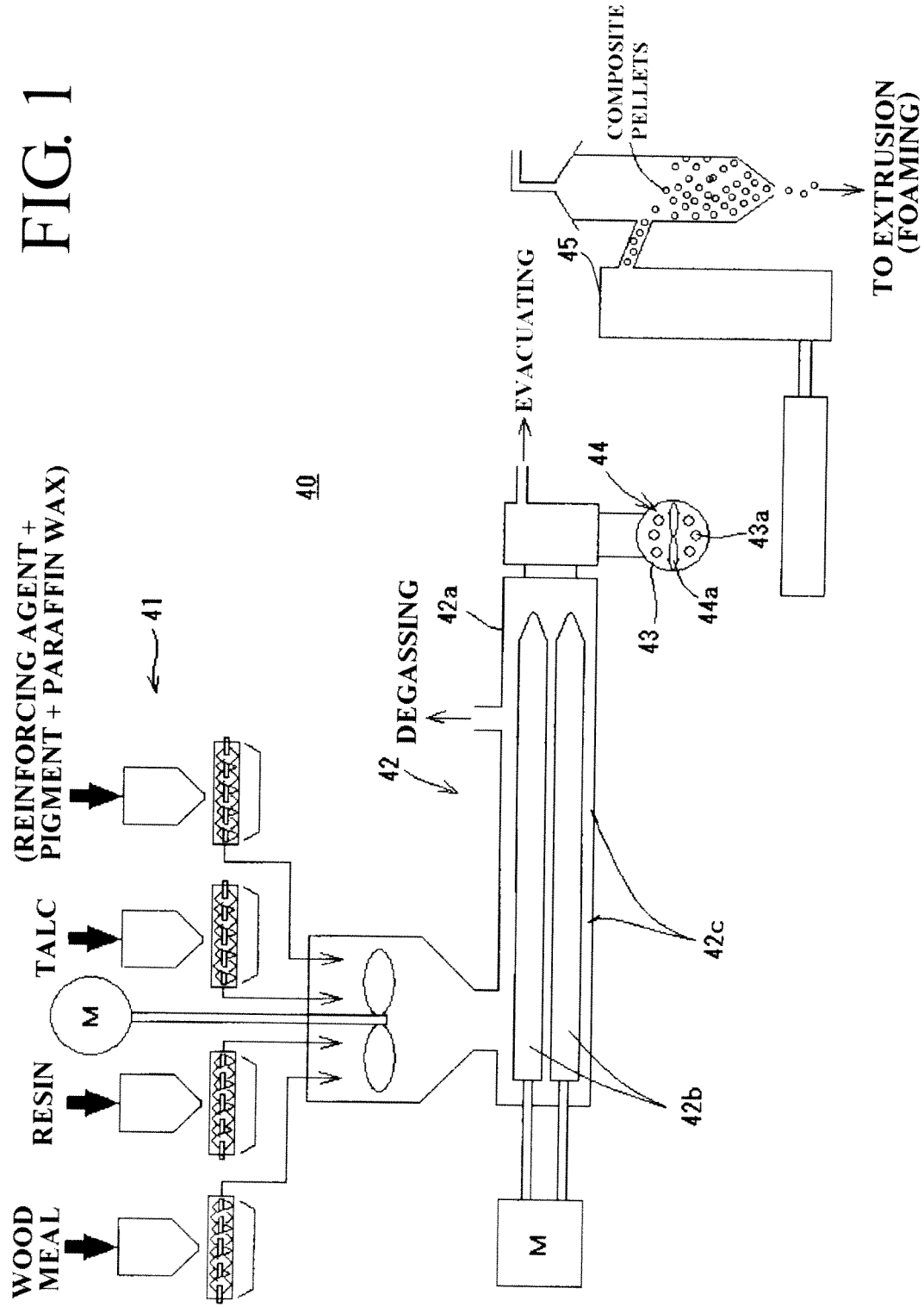
FIG. 1 is a drawing illustrating the outline of an apparatus for manufacturing composite pellets according to Embodiment 1.

Embodiments according to the present invention will now be described with reference to the attached drawings.

Raw Materials

Composite pellets, according to the present invention, used to manufacture synthetic wood products by extrusion are produced by adding a filler such as talc, a coloring pigment, a reinforcing agent, paraffin wax, and other secondary materials, as required, to main raw materials containing a thermoplastic resin and wood meal.

Composite pellets that are to have a metal salt of 12-hydroxystearic acid deposited thereon, as described below, are manufactured by adding talc, calcium carbonate, other nonorganic fillers, and secondary materials such as a reinforcing agent, a coloring agent, and an antioxidant, as required, to main raw materials containing a thermoplastic resin and wood meal.

Thermoplastic Resin

Various types of thermoplastic resins can be used as the thermoplastic resin, which is one of the main ingredients of the composite pellets according to the present invention. A polyolefin resin, such as polypropylene (PP) or polyethylene (PE), and other resins containing this polyolefin resin as the main ingredient (hereinafter, the polyolefin resin and other resins containing polyolefin resin as the main ingredient are collectively referred to as the "polyolefin-series resin") can be used preferably.

In addition, not only can a single type of these thermoplastic resins be used, but also multiple different types of these thermoplastic resins can be used in combination. For example, waste plastic containing two or more different types of thermoplastic resins can be collected for use as raw materials. In this embodiment, however, the polyolefin-series resin, more particularly, polypropylene (PP), from among the above-described various types of thermoplastic resins is used.

Here, the types of polypropylene (PP) include homopolymer, random copolymer, and block copolymer. In the present invention, any of these types of polypropylene can be used. For example, polypropylene collected in accordance with the Containers/Packaging Recycling Act, polypropylene containing different types of polypropylene, and so forth can be used.

Thermoplastic resins used with the present invention should preferably have a melt index (MI) of 0.5 to 10 (g/10 min); for example, a plurality of thermoplastic resins with different MIs may be mixed to produce a resin with an MI falling within the above-described value range.

Wood Meal

For wood meal, constituting the other of the main ingredients of the molding materials, various types of commercially available wood meal can be used. Alternatively, wood meal may be prepared by crushing unused wood, used waste building materials, waste materials, such as sawdust, generated during wood processing, and so forth by using a tool such as a crusher, cutter, or mill.

The type of the wood to be used is not particularly limited, and combined use of a plurality of types of wood will not pose any structural problem. However, it is preferable to use wood types with some consistent color and grain, taking into consideration the external appearance of the finally obtained synthetic wood product.

For wood meal, any type of wood meal with a grain size of 1,000 μm or less can be used. Wood meal with a grain size of 150 to 200 μm should preferably be used.

Wood meal should preferably be dried before being mixed with the other raw materials in order to enhance the affinity with a thermoplastic resin and prevent moisture vapor from being released at the time of heat-kneading. More preferably, wood meal with a water content of 1 mass % or less should be used.

A preferable compounding ratio between this wood meal and the above-described thermoplastic resin is 30-70 mass % (wood meal):70-30 mass % (thermoplastic resin).

Figure 2:
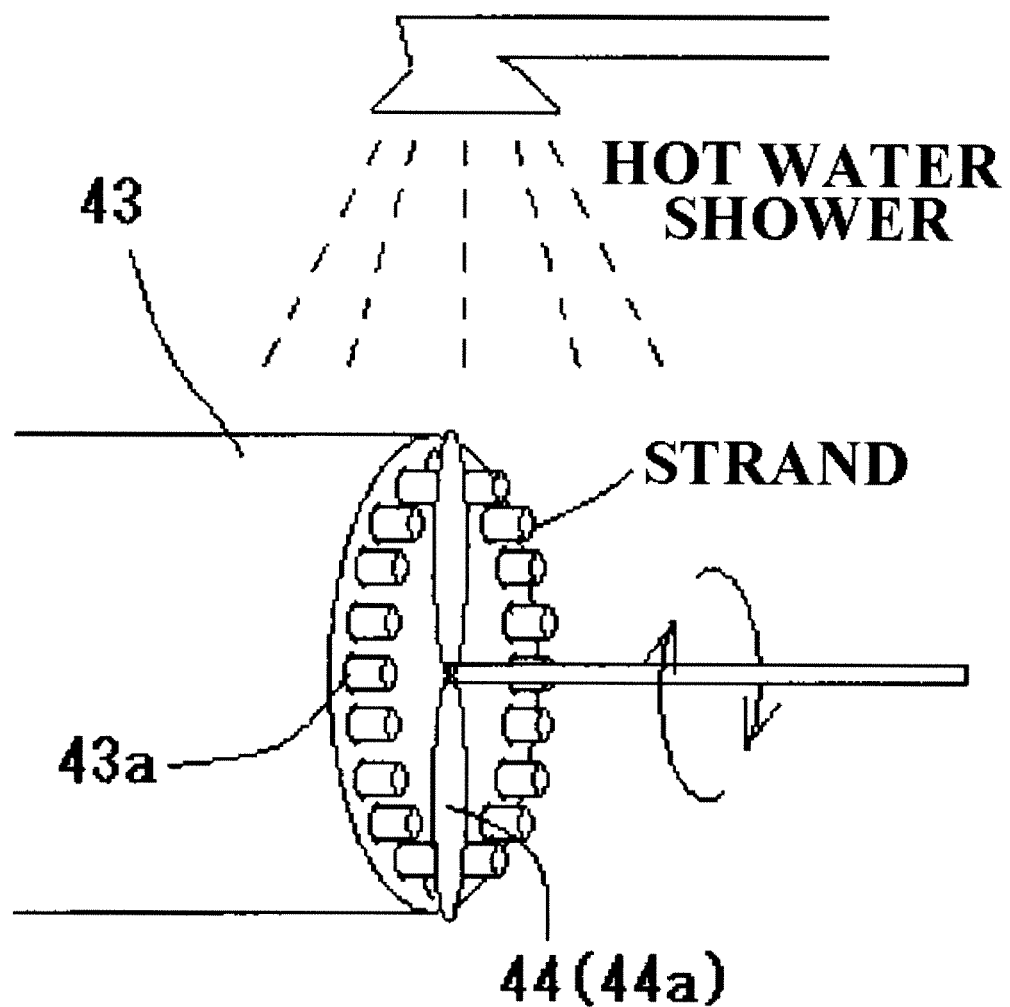
FIG. 2 is an illustration of cutting of strands according to Embodiment 1.
Figure 3:
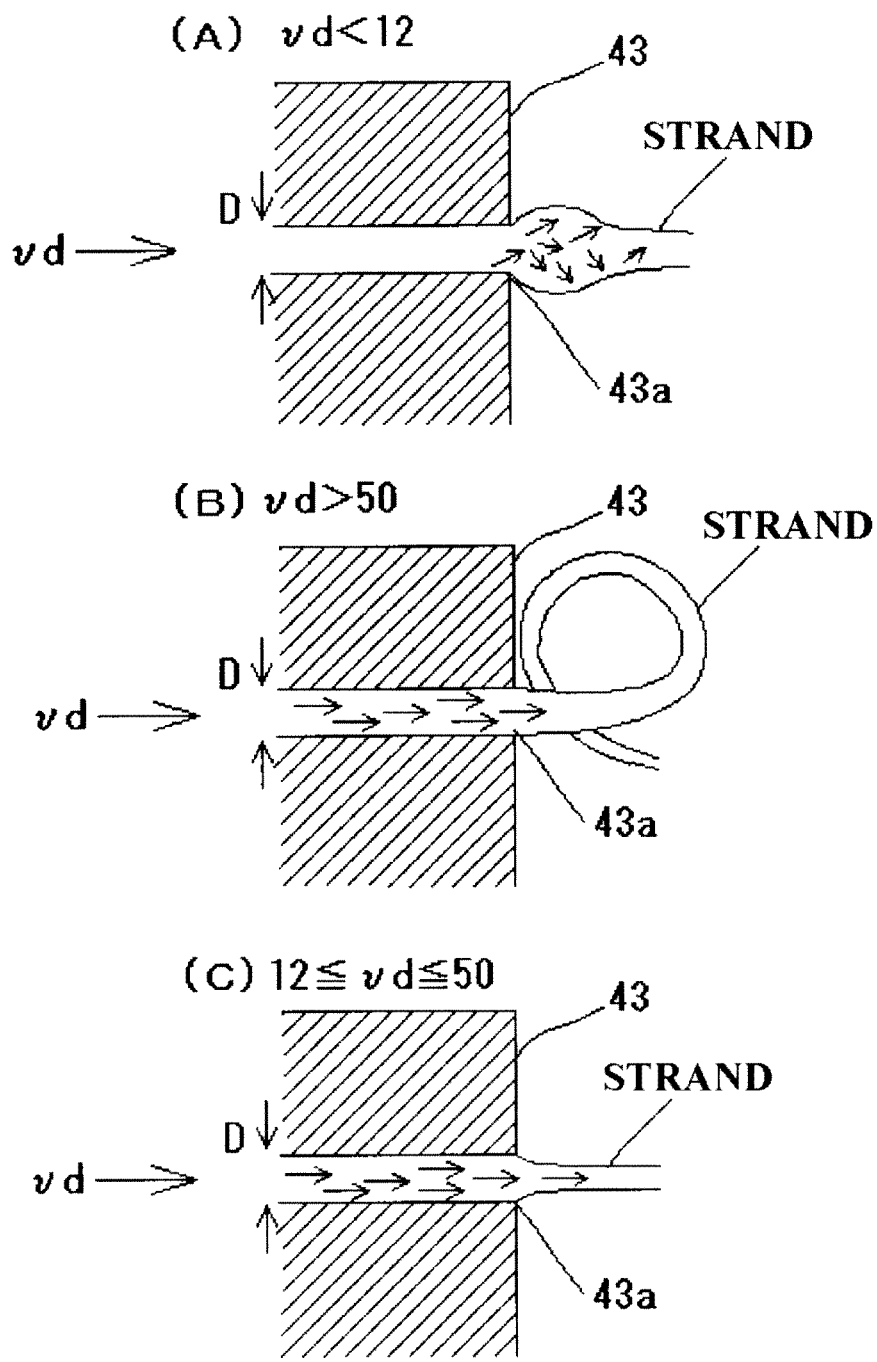
FIG. 3 are drawings illustrating the relationship between linear velocity vd and the foaming of a strand according to Embodiment 1, (A) showing a case where the linear velocity vd is lower than 12 cm/sec, (B) showing a case where the linear velocity vd is over 50 cm/sec, and (C) showing a case where the linear velocity vd falls within a range of 12 to 50 cm/sec.

Due to these structures and composition; shearing force applied to the molten materials, which is generated at the central portion, inner wall, and its neighbors in a nozzle hole 43a of a die nozzle 43 shown in FIGS. 2 and 3; and difference of flow velocities vd among the molten materials, an aggregate of fibers in which grains or fibers of an aspect ratio (length/diameter) of 1.5 or more account for 80% or more are oriented in the flow direction.

Other Raw Materials

As raw materials of the molding materials according to the present invention, a filler such as talc, a coloring pigment, a reinforcing agent, paraffin wax, and so forth can be added, in addition to the above-described wood meal and thermoplastic resin.

As a raw material of the molding materials according to the present invention, a nonorganic filler such as talc and calcium carbonate, a coloring pigment, a reinforcing agent, an antioxidant, and so forth can be added, in addition to the above-described wood meal and thermoplastic resin.

Of these raw materials, paraffin wax is added by 1 to 5 mass % of the total of the produced molding materials. If paraffin wax to be added is less than 1 mass %, the paraffin wax does not produce any effect, whereas if paraffin wax of more than 5 mass % is added, it will surface, decreasing the molding performance.

Talc, which is to enhance the strength of the finally obtained synthetic wood product, such as a synthetic wood board, can be added by 5 to 25 mass % of the total mass of the molding materials. If a smaller amount of talc than this is added, the strength of the final article cannot be enhanced. On the other hand, if too much talc is added, the final article become fragile, thus decreasing its own strength.

Talc to be added can have a relatively wide range of grain sizes. The average grain size of talc should preferably range from about 3 to 50 μm.

A pigment is added to color the finally obtained synthetic wood board. According to the intended color of the final article, various types of pigments can be added at various compounding ratios.

In this embodiment in which an iron-oxide-based pigment is used to apply brownish coloring as one example, a pigment was added by about 3 mass % of the total mass of the molding materials.

Furthermore, a reinforcing agent can also be added as an additive material. In this embodiment in which polypropylene is used for the thermoplastic resin, serving as one of the main raw materials, as described above, maleic modified polypropylene is added as the reinforcing agent to enhance the coupling between the wood meal and the resin.

This reinforcing agent does not produce any effect if its amount is too small, and the larger the amount of this reinforcing agent, the more significant its effect (though the higher the cost). Thus, this reinforcing agent should be added preferably by, for example, about 0.3 to 2.0 mass % of the total mass of the obtained molding materials.

Manufacturing Molding Materials

Apparatus for Manufacturing Composite Pellets

Wood meal and a thermoplastic resin serving as constituent raw materials of composite pellets, as well as secondary materials including a filler such as talc, a pigment, a reinforcing agent, and paraffin wax added as required, are melt-kneaded by an extruder until they are distributed uniformly, and the molten materials obtained by melt-kneading are formed into grains to manufacture composite pellets.

Composite pellets can be manufactured using various types of known apparatuses for manufacturing pellets. The method of manufacturing pellets is not particularly limited, as long as pellets can be manufactured by the manufacturing method. For example, as described in the related art, composite pellets may be produced by delivering raw materials into the extruder, and extruding circular-belt-shaped strands through the nozzle-shaped die mounted at the front end of the barrel of the extruder while melt-kneading the raw materials and then cutting the strands at intervals of a predetermined length. Alternatively, composite pellets may be produced in a batch by crushing kneaded materials pre-kneaded with a known mixer, for example, a Henschel mixer into predetermined grain sizes. Alternatively, composite pellets may be produced by granularizing kneaded materials that have been pre-kneaded into grains with a predetermined grain size before the kneaded materials harden.

Composite pellets manufactured in this manner are used as molding materials when a synthetic wood product, such as a synthetic wood board, is to be formed by extrusion.

The manufacturing of composite pellets by melt-kneading raw materials for granularization in this manner can be performed using a composite-pellet manufacturing apparatus 40 shown in FIG. 1.

The composite-pellet manufacturing apparatus 40 shown in FIG. 1 includes a feeder 41 for supplying a constant amount of raw materials including, for example, a thermoplastic resin (PP), wood meal, talc, pigment, reinforcing agent, and paraffin wax by the loss-in-weight method; and a screw extruder 42 for melt-kneading and extruding the constant amount of raw materials supplied by this feeder 41 while heating the raw materials. The composite-pellet manufacturing apparatus 40 manufactures composite pellets by the underwater hot-cut method, in which the die nozzle 43 having many small holes (nozzle holes 43*a*) formed therein is mounted at the front end of a cylinder 42*a* of this extruder 42, the strands of molten materials are extruded into hot water through the nozzle holes 43*a* of this die nozzle 43, and these strands are cut at intervals of a predetermined length (e.g., 2 to 5 mm) with a cutter blade 44*a* of a rotating cutter 44.

In this embodiment, the strands of molten materials extruded at a predetermined speed can be cut to a substantially constant length by forming the plurality of nozzle holes 43*a* in the rim of the end surface of the cylindrical die nozzle 43, as shown in FIGS. 1 and 2, and by rotating at a constant speed the cutter blade 44*a* having its rotation center at the center of the end surface of this die nozzle 43 such that the cutter blade 44*a* comes into sliding contact with the end surface of the die nozzle 43.

More specifically, with this structure, the length of the produced pellets can be changed by changing the rotational speed of the cutter 44 if the extrusion speed (equivalent to the above-described linear velocity vd) of the strands is constant; by changing the extrusion speed (equivalent to the above-described linear velocity vd) of the strands if the rotational speed of the cutter 44 is constant; or by changing both the extrusion speed (equivalent to the above-described linear velocity vd) of the strands and the rotational speed of the cutter 44.

For this extruder 42, various known types of extruders, including an uniaxial extruder, can be used. Preferably, a biaxial extruder should be used.

A biaxial extruder is an extruder including two screws 42*b* that rotate by means of the screw thread formed in a screw element 42*c* and the screw groove being engaged with each other. In this embodiment, the extruder used is an extruder that brings about the effect of melting resin by rotating the two screws 42*b* in the same direction and applying a shearing force to the materials to promote heat generation. Alternatively, a biaxial extruder in which the two screws rotate in different directions may be used.

The temperature of the cylinder 42*a* of the above-described extruder 42 is controlled so that the molten materials melt-kneaded by the extruder 42 can be introduced preferably into the nozzle holes 43*a* of the above-described die nozzle 43 at temperatures of 170° C. to 250° C., preferably at temperatures of 200° C. to 230° C.

Figure 5:
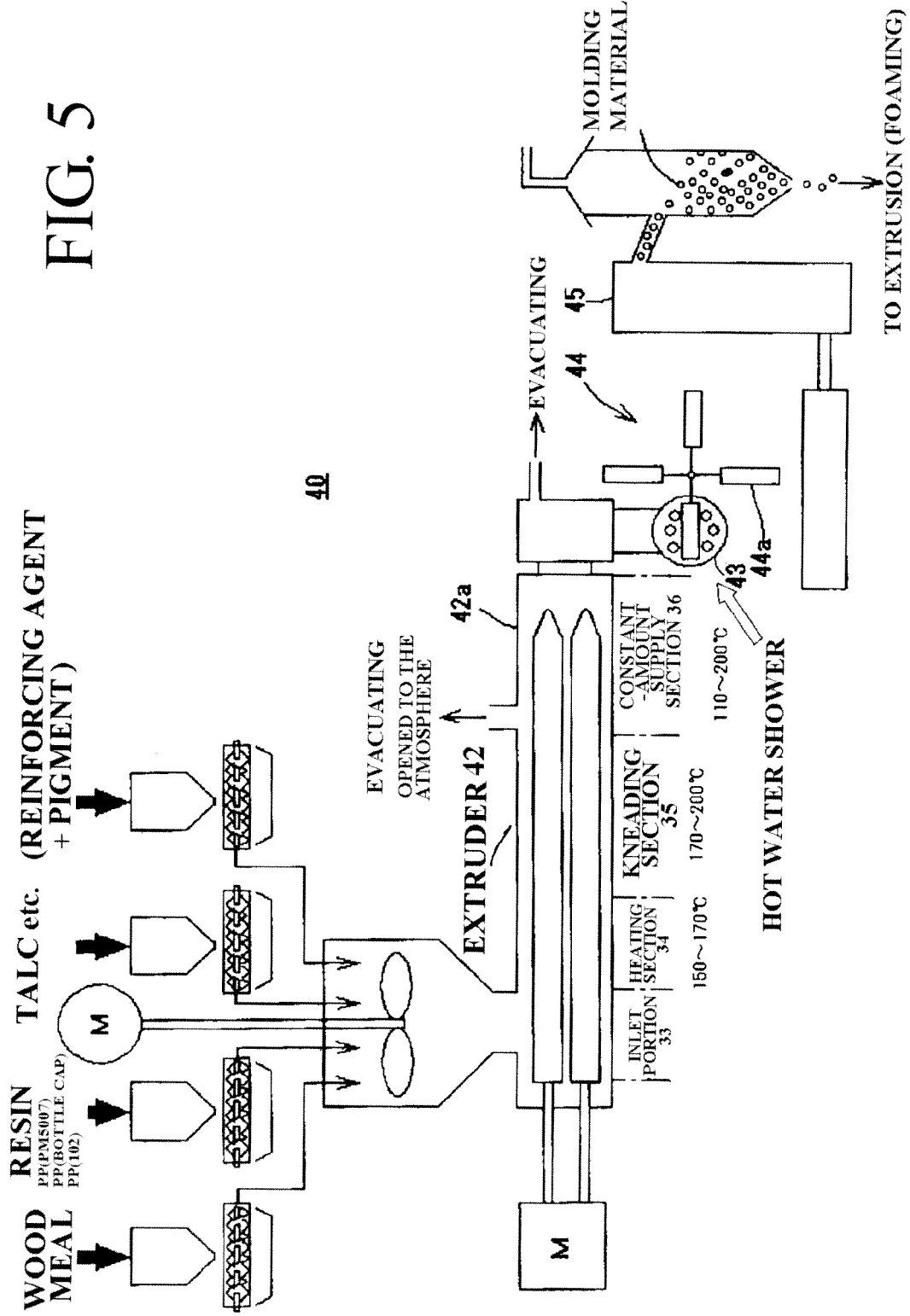
FIG. 5 is an outline drawing illustrating an apparatus for manufacturing composite pellets used for a manufacturing test (Test Examples 1 and 2) of composite pellets according to Embodiment 1.

Here, the above-described temperatures indicate the temperatures of the molten materials, whereas the temperatures described in FIG. 5 indicate the setting temperatures of the cylinder of the extruder, which differs from the temperatures of the molten materials. Because the molten materials generate shearing heat resulting from an external force from the screws 42*b*, in addition to the heat from the heater of the cylinder 42*a*, the temperature of the molten materials becomes higher than the setting temperature of the cylinder.

The composite pellets obtained in this manner are collected after being dried by a centrifuge 45 and used as composite pellets in the form of molding materials to produce a synthetic wood product by extrusion.

Manufacturing Conditions

In the composite-pellet manufacturing apparatus 40 with the above-described structure, the rate of extrusion (Q) of the extruder, the diameter (D) of each nozzle hole, and the number (n) of nozzle holes are adjusted so that a linear velocity vd, representing how far the molten resin travels in one second along the individual nozzle holes 43*a* formed in the die nozzle 43, falls within a range of 12 to 50 cm/sec, preferably, within a range of 16 to 45 cm/sec.

Assuming that:
Q=rate of extrusion by the extruder (kg/Hr),
D=diameter of each nozzle hole (mm),
n=number of nozzle holes, and
ρm=density of the molten resin
the rate of extrusion by the extruder per-second (g/sec) is represented as:

$$Q \times 1000/3600,$$

the cross-sectional area of each nozzle hole taken along the width direction (cm$^2$) is expressed as:

$$(D/20)^2 \pi,$$

and therefore, the total sum of the cross-sectional areas of the n nozzle holes taken along the width direction is:

$$(D/20)^2 \pi \cdot n.$$

As a result, the above-described linear velocity vd is:

$$vd (\text{cm/sec}) = (Q \times 1000/3600) / [(D/20)^2 \pi \cdot \rho m \cdot n]$$

$$\approx 35.4 \ Q/D^2 \rho m \cdot n.$$

Assume that, for example, an extruder with a per-hour extrusion rate Q of 400 kg/Hr is employed as the extruder 42 constituting the composite-pellet manufacturing apparatus 40 and that the bulk density ρm of the molten materials is 1.15 (g/cm$^3$). Under this assumption, if a die nozzle with each nozzle hole 43*a* of 4.0 mm in diameter D is used as the die nozzle 43, vd=(Q×1000/3600)/[(D/20)$^2$π·ρm·n]≈35.4 Q/D$^2$ρm·n, and therefore, vd=(35.4×400)/(4$^2$×1.15×n)=14160/18.4n.

Therefore, when 14160/18.4n is substituted into vd of "12≤vd≤50",

12≤14160/18.4n≤50.

Therefore, under the above-described conditions, composite pellets meeting the condition required for the predetermined linear velocity vd according to the present invention can be manufactured by setting the number n of nozzle holes 43a to a value ranging from 16 to 64.

Influences of Changes in Linear Velocity vd Upon Composite Pellets

Here, if the linear velocity vd of the molten materials passing through a nozzle hole 43a is lower than 12 to 50 cm/sec (vd<12), which is the predetermined range according to the present invention, the effect of orienting wood meal resulting from the flow of these molten materials is modest.

Furthermore, if strands are to be extruded at such a low flow velocity, the molten resin that has passed through the nozzle hole 43a inflates due to the Barus effect, as shown in FIG. 3(A).

For this reason, due to a moderate effect of orienting wood meal, as described above, as well as volume inflation due to the Barus effect, the wood meals in the strands are oriented randomly in different directions, as indicated by the arrows in FIG. 3(A), and are not oriented in a particular direction.

On the other hand, if the flow velocity vd of the molten materials is above 12 to 50 cm/sec (vd>50), which is the predetermined range according to the present invention, then the wood meals in the molten materials are oriented such that the fiber length directions thereof are directed to the flow direction of the molten materials while passing through the nozzle hole 43a.

In addition, the molten materials that have passed through the nozzle hole 43a are prevented from inflating due to the Barus effect.

However, if the strands of molten materials are extruded at such a high flow velocity, the molten materials that have passed through the nozzle hole 43a change their flow, affected by slight abnormalities near the outlet of the nozzle hole 43a, such as a minor flaws or irregularities inevitably generated at the outlet of the nozzle hole 43a while the die nozzle was being manufactured, as shown in FIG. 3(B). As a result, the strands go out of control in the form of a curl or loop after being extruded and are likely to come into contact with, and adhere to, strands extruded through nozzle holes 43a provided either adjacent or within a relatively nearby area.

In contrast, if the flow velocity vd of the molten resin in a nozzle hole 43a falls within the predetermined range according to the present invention (12≤vd≤50), then the wood meals in the molten materials are oriented in the flow direction of the molten materials, as shown in FIG. 3(C), the molten materials that have passed through the nozzle hole 43a can be prevented from inflating due to the Barus effect at this speed, and the diameters of the extruded strands are below the diameter D of the nozzle hole 43a.

Moreover, within the range of the predetermined vd according to the present invention, the strands that have passed through the nozzle hole 43a are prevented from going out of control due to a slight flaw or irregularities inevitably generated near the outlet of the nozzle hole 43a while the die nozzle 43 was being manufactured. Strands that have become more resilient by virtue of the wood meals oriented such that their length directions are directed to the flow direction of the molten resin, as described above, are easily extruded in the direction in which the nozzle hole extends.

As described above, if the linear velocity vd is below the value range of 12 to 50 cm/sec depending on the difference of the linear velocity vd, then a shearing force generated when the strands are cut is not applied uniformly because of different orientations of the wood meals, possibly causing the strands to deform and therefore easily producing pellets with non-uniform shapes. Furthermore, because the strands increase in volume due to their inflation and are brought closer to the neighboring strands, the strands easily adhere to the neighboring strands when cut, possibly producing a mass of multiple pellets adhering to one another.

In the example of FIG. 3(B), in which the linear velocity vd is above the value range of 12 to 50 cm/sec, although the wood meals are oriented in a predetermined direction in the extruded strands, the strands extruded through the nozzle hole go out of control in the form of for example, a curl, as described above. Therefore, pellets produced by cutting such strands are likely to have various shapes.

In addition, as a result of the strands extruded through the nozzle hole going out of control, as described above, the neighboring strands are likely to adhere to one another, causing pellets produced by cutting those strands to adhere to one another to form a mass.

In contrast, in the example of FIG. 3(C), in which the linear velocity vd falls within the range of 12 to 50 cm/sec, indicating the predetermined range according to the present invention, the strands exiting the nozzle hole are prevented from inflating due to the Barus effect because the strands become more resilient by virtue of the same orientations of the wood meals. Furthermore, because of the same orientations of the wood meals, the strands can be cut cleanly and are likely to produce pellets of uniform shapes.

Moreover, because the strands extruded under this condition do not inflate or go out of control, they are not likely to adhere to the strands extruded through neighboring nozzle holes 43a. As a result, the strands can be easily cut to produce pellets that are not massed and are separated from one another.

Deposition of Metal Salt of 12-Hydroxystearic Acid

Before being used for extrusion, the composite pellets manufactured as described above may have a predetermined amount of metal salt of 12-hydroxystearic acid (hereinafter, abbreviated as "12HOS-M") deposited on the outer circumferences thereof.

Metals contained in 12HOS-M used as such an additive include calcium (Ca), zinc (Zn), magnesium (Mg), aluminum (Al), barium (Ba), lithium (Li), and sodium (Na). 12HOS-M containing any of these metals may be used.

Because it has the lowest price of these substances, 12-hydroxystearic acid calcium salt containing calcium (Ca) (hereinafter, abbreviated as "12HOS-Ca") should preferably be used.

In addition, because of its normal use in the industry and high availability, metal salt containing magnesium (Mg) or zinc (Zn) can also be employed preferably.

Of the higher fatty acids, metal stearates, such as calcium stearate (hereinafter, abbreviated as "st-Ca"), are well known as a lubricant. However, the above-described 12HOS-M (e.g., 12HOS-Ca) used in the present invention differs from this metal stearate (e.g., st-Ca) in that 12HOS-M has an "—OH" group at the 12th carbon of the carbon chain.

The above-described composite pellets and 12HOS-M are stirred together to deposit 12HOS-M on the surface of each particle of the composite pellets.

Deposition of 12HOS-M on the composite pellets can be performed by any method. In this embodiment, although not restricted thereto, composite pellets and 12HOS-M are delivered in the same container and stirred in this container to deposit 12HOS-M on the surfaces of the composite pellets.

Figure 16:
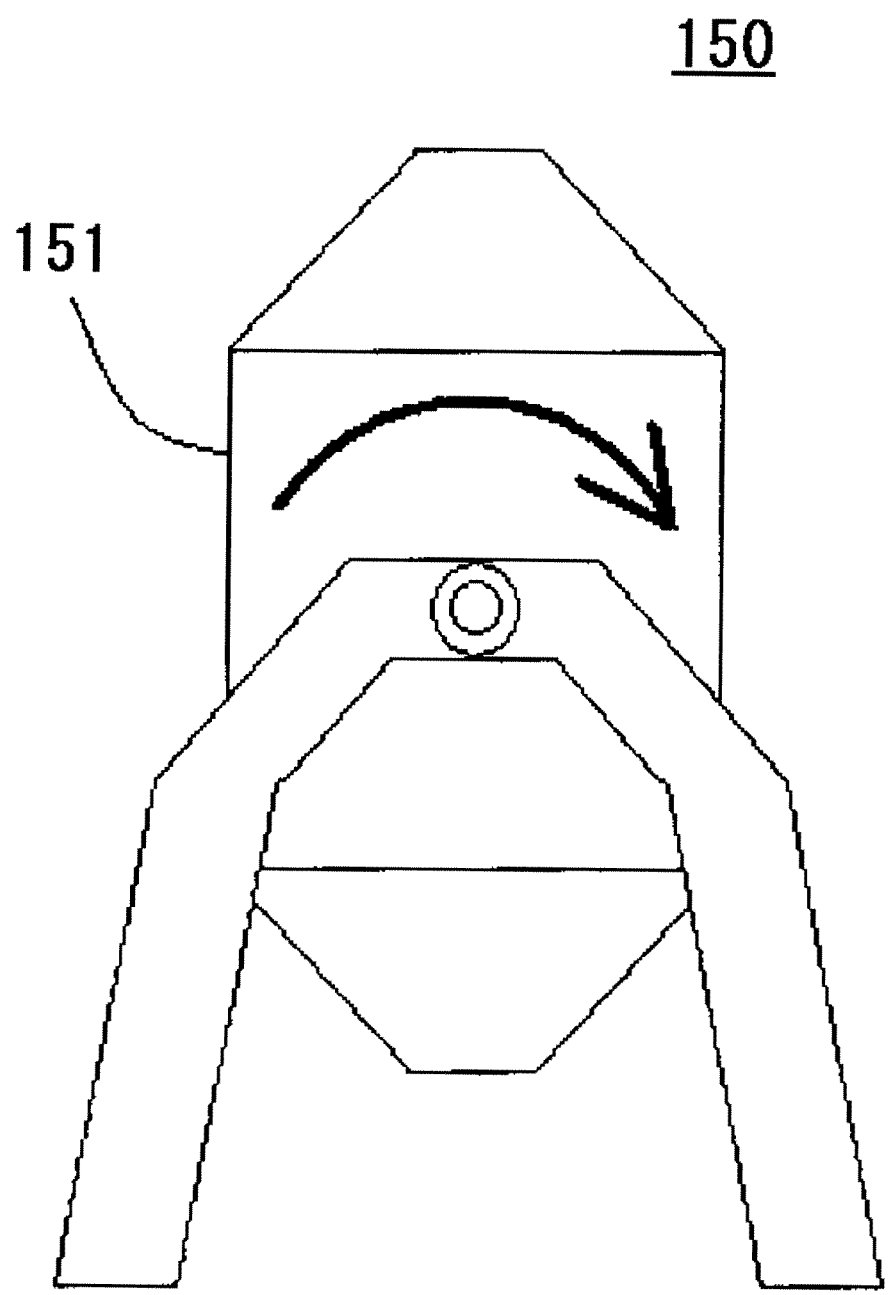
FIG. 16 is an outline drawing of a tumbler mixer according to Embodiment 2.

More specifically, in this embodiment, composite pellets and 12HOS-M were delivered together in a sealed container 151 provided in a tumbler mixer 150 shown in FIG. 16, and the sealed container 151 was rotated as indicated by the arrow in the figure to deposit 12HOS-M on the surfaces of the composite pellets.

The amount of 12HOS-M to be deposited on the composite pellets is 0.03 to 0.4 mass %, preferably 0.05 to 0.3 mass %, relative to the composite pellets as 100 mass %. As shown in the Test example discussed below, 0.03 mass % or less of 121-HOS-M does not produce any marked effect, whereas the effect saturates with more than 0.4 mass % of 12HOS-M.

Operation and Effect

Figure 17:
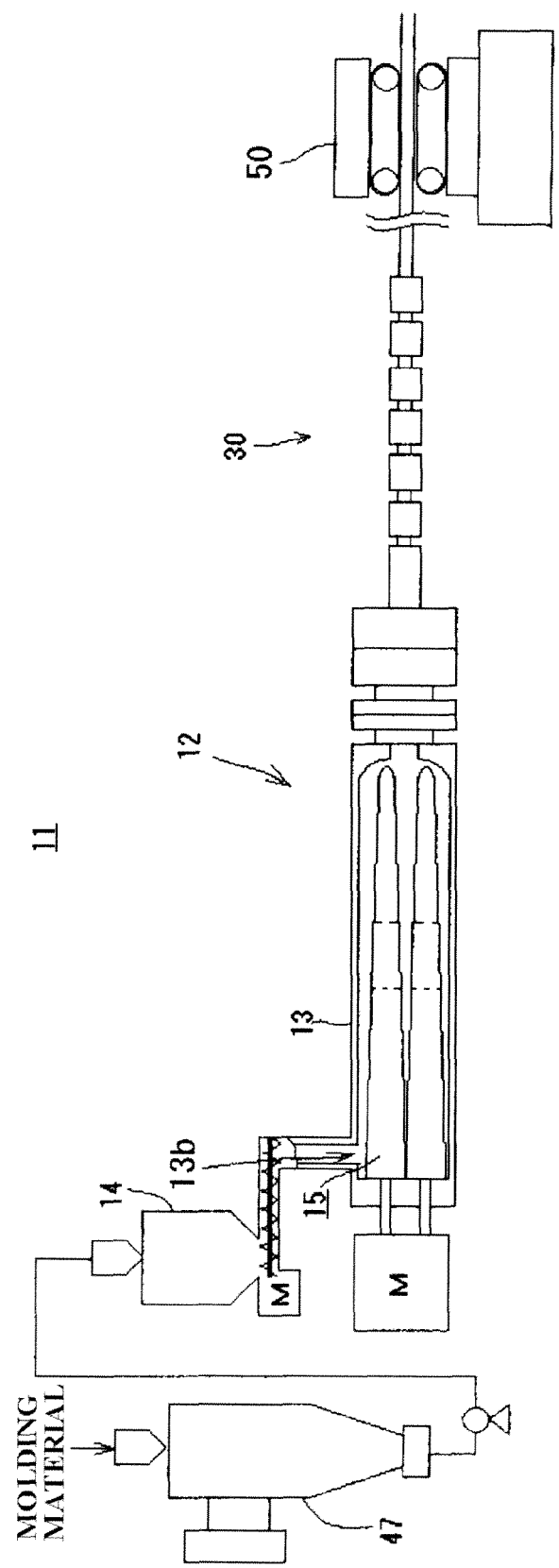
FIG. 17 is an outline drawing illustrating an extrusion apparatus used for a characteristic check test of composite pellets of the present invention according to Embodiment 2.
Figure 18:
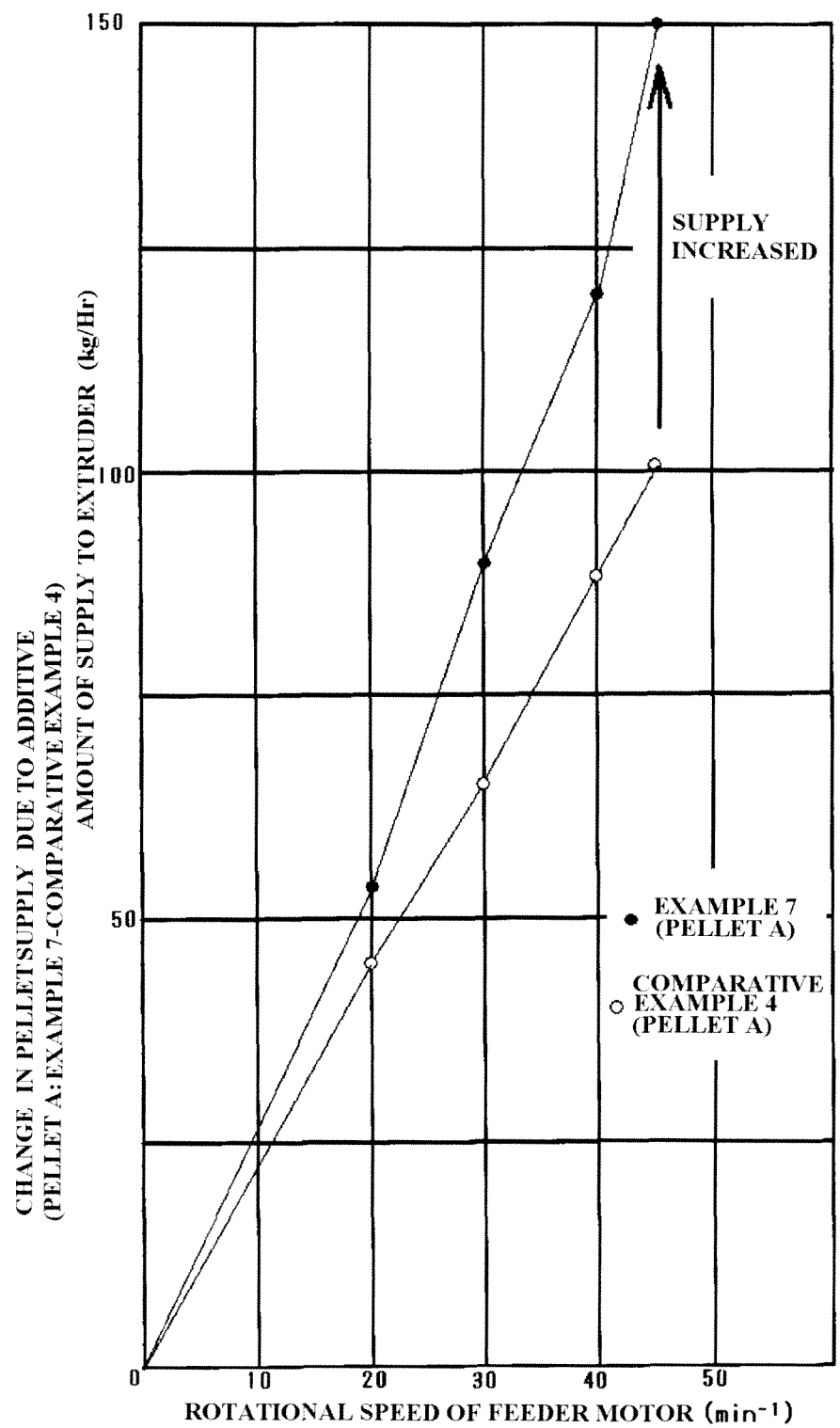
FIG. 18 is a graph showing changes in the amount of supplied pellets (pellets A: Example 7-Comparative Example 4) due to an additive (12HOS-Ca) of Embodiment 2.
Figure 19:
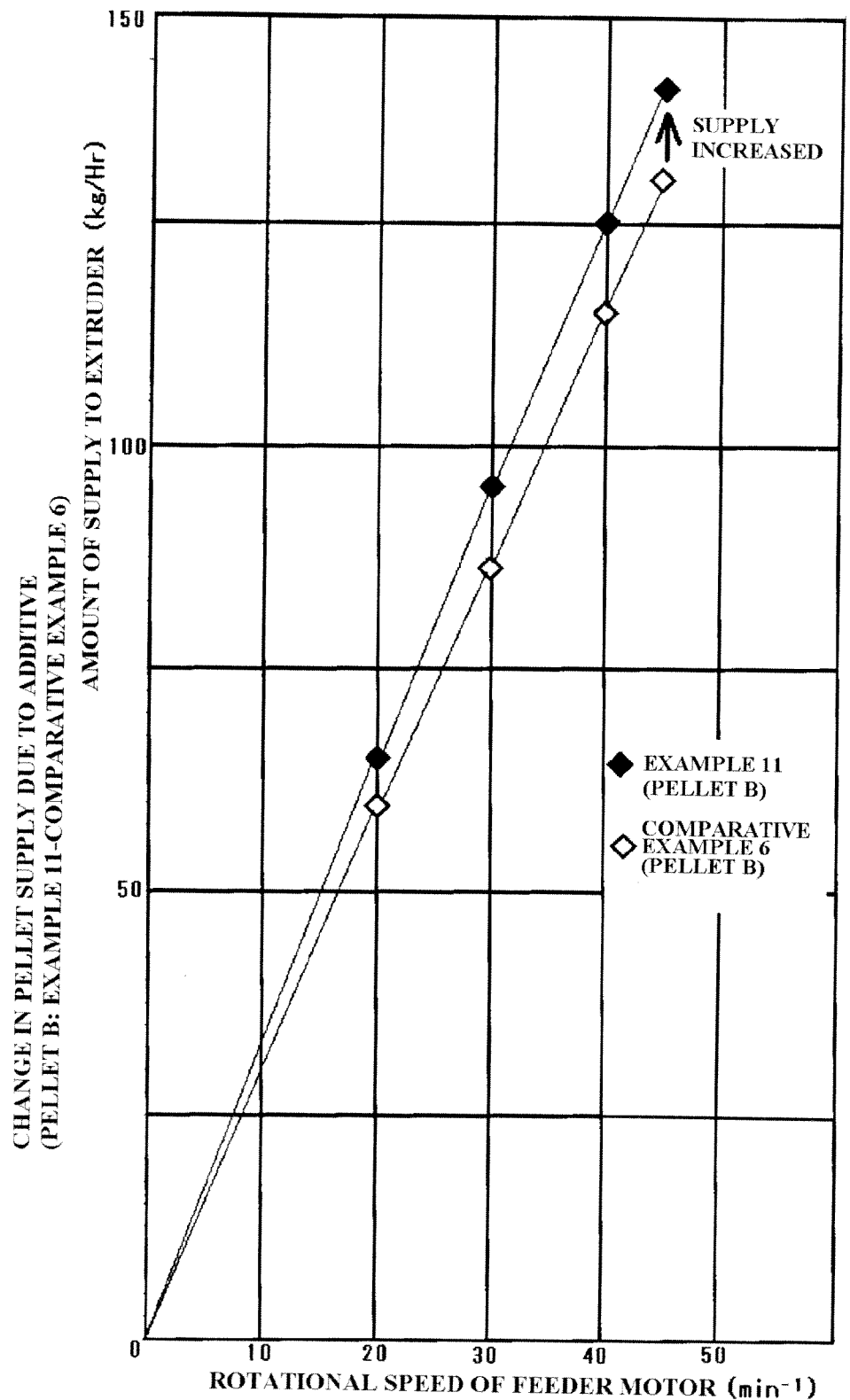
FIG. 19 is a graph showing changes in the amount of supplied pellets (pellets B: Example 11-Comparative Example 6) due to an additive (12HOS-Ca) of Embodiment 2.
Figure 20:
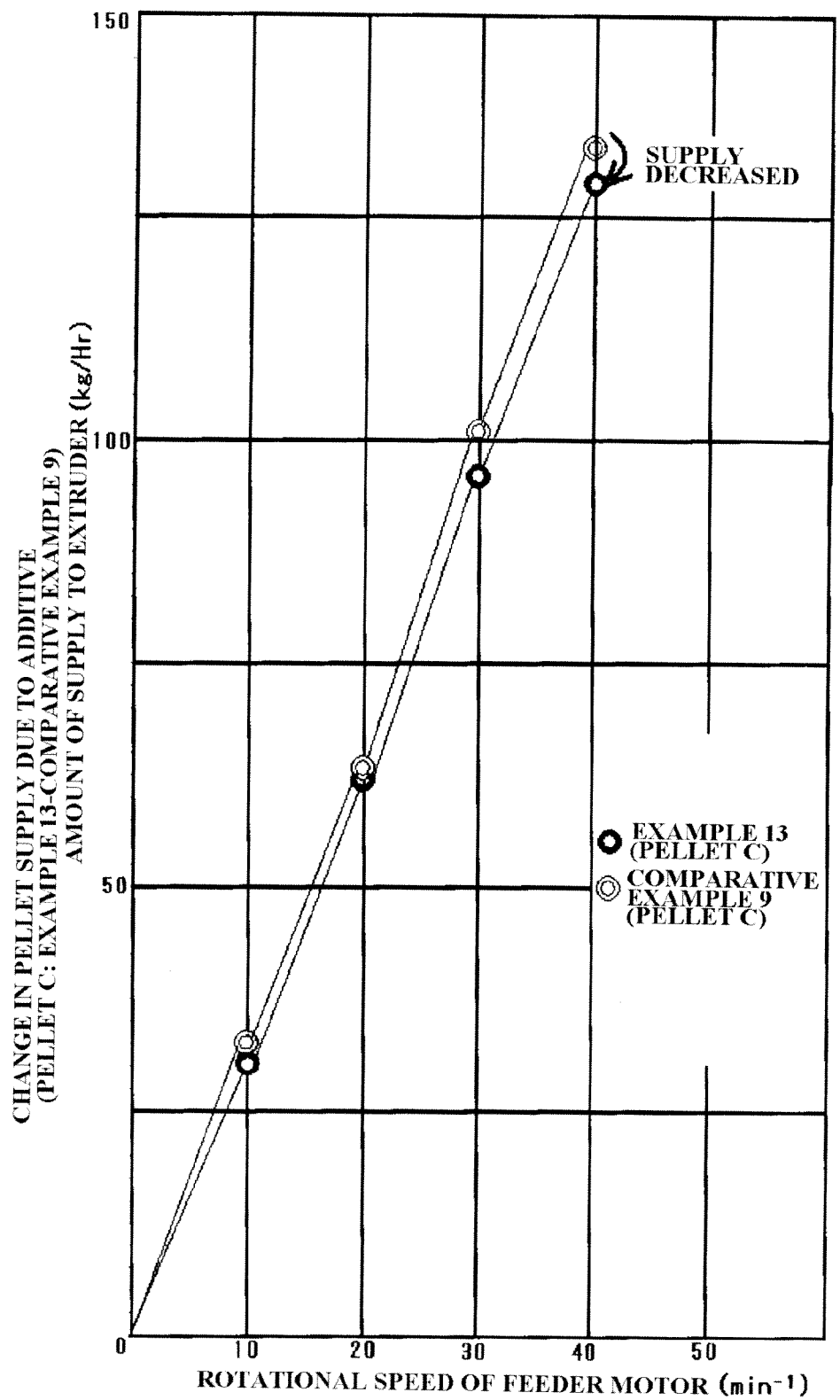
FIG. 20 is a graph showing changes in the amount of supplied pellets (pellets C: Example 13-Comparative Example 9) due to an additive (12HOS-Ca) of Embodiment 2.
Figure 21:
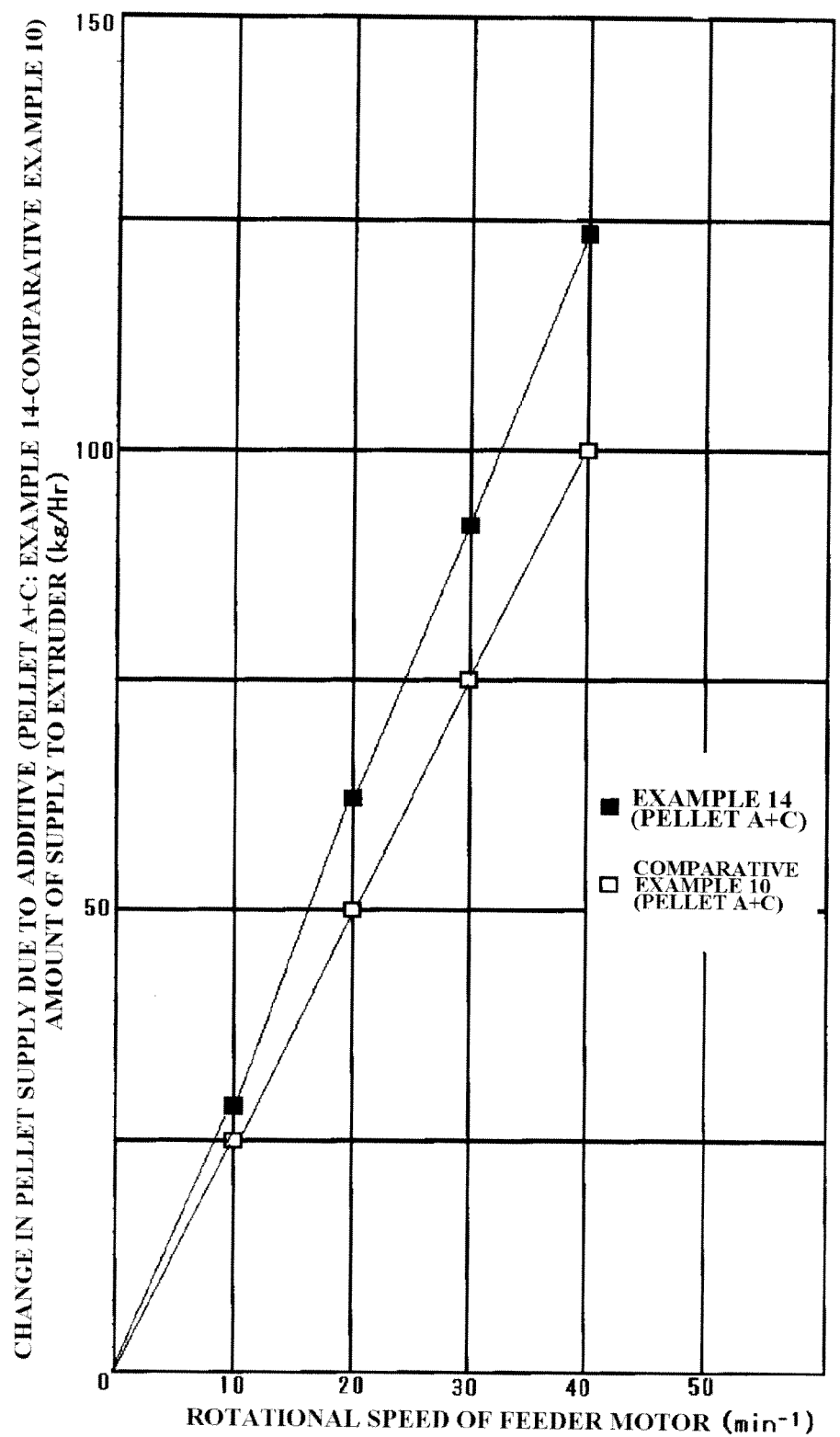
FIG. 21 is a graph showing changes in the amount of supplied pellets (pellets A+C: Example 14-Comparative Example 10) due to an additive (12HOS-Ca) of Embodiment 2.

As shown in FIG. 17, an extrusion apparatus 11 used to form synthetic wood products by extrusion includes, for example, a feeder 14 for supplying a constant amount of composite pellets, serving as molding materials; an extruder 12 for melt-kneading the constant amount of composite pellets supplied by this feeder 14 while heating them to extrude the molten materials; a molding die 30 for forming the extrusion materials extruded by the extruder 12 into a predetermined shape; and a collection machine 50 for collecting the molded article formed by this molding die 30.

Of these, the feeder 14 includes a screw conveyer at the lower end of a hopper into which the composite pellets are delivered. A constant amount of composite pellets can be supplied to the extruder 12 by rotating the screw of the screw conveyer with a motor M.

However, even though the rotational speed of the motor M is maintained constant in this feeder 14, the amount of composite pellets to be supplied may vary. The amount of composite pellets supplied to the extruder 12 varies particularly when the pellet sizes are varied.

For composite pellets having 12HOS-M as an additive deposited on the surfaces thereof, as described above, it was possible to stably supply a constant amount of composite pellets from the feeder 14 to the extruder 12 without changing the rotational speed of the motor M provided in the feeder 14.

Here, regarding the amount of composite pellets supplied to the extruder assuming that the rotational speed of the motor M in the feeder 14 is constant, the smaller the pellet sizes, the larger the amount, whereas the larger the pellet sizes, the smaller the amount, in the case of composite pellets not having 12HOS-M deposited on the surfaces thereof.

For this reason, if the grain sizes of pellets to be used vary, then the amount of supply to the extruder changes, preventing a stable amount of pellets from being supplied.

In contrast, in the case of composite pellets, according to the present invention, having 12HOS-M deposited on the surfaces thereof, the amount of pellets supplied becomes substantially constant, regardless of the grain sizes of the composite pellets to be used, thus allowing a stable amount of composite pellets to be supplied to the extruder 12.

Here in the present invention, if 12HOS-M deposited on the surfaces of the composite pellets serve simply as a "lubricant," the fluidity of the composite pellets are expected to increase uniformly, regardless of whether the grain sizes of the pellets are large or small, thereby increasing the amount of supply.

In fact, as described in detail in the following test examples, it has been confirmed that composite pellets having 12HOS-M deposited on the surfaces thereof decrease in the amount of supply if their grain sizes are smaller than a particular size while increasing in the amount of supply if their grain sizes are large. As a result, an unexpected effect was produced in that even if the grain sizes of pellets are various, a substantially constant amount (in terms of weight) of pellets can be supplied to the extruder 12 without changing the setting for the feeder 14.

As described below, an evaluation based on specific energy (Esp), which represents the amount of energy required for the extruder 12 to extrude 1 kg of molten materials, has confirmed that the amount of pellets clinging to a screw 15 of the extruder 12 also increased in the case of composite pellets having 12HOS-M deposited on the surfaces thereof.

Although the reason such an effect is brought about is not necessarily clear, it is probably because 12HOS-Ca used in the Examples, unlike st-Ca which is known as a lubricant, includes an "—OH" group in the carbon chain.

Composite pellets for extrusion, according to the present invention, that have been obtained as described above may be supplied to the extruder 12 together with, for example, a foaming agent so as to be used for extrusion foam molding.

Manufacture of Synthetic Wood Product

Composite pellets that have been obtained as described above are used, for example, to form a synthetic wood product.

Drying Composite Pellets

Composite pellets that have been obtained as described above undergo extrusion (foaming), either as-is or together with a foaming agent, so as to be used to form a synthetic wood product of a predetermined shape.

Figure 4:
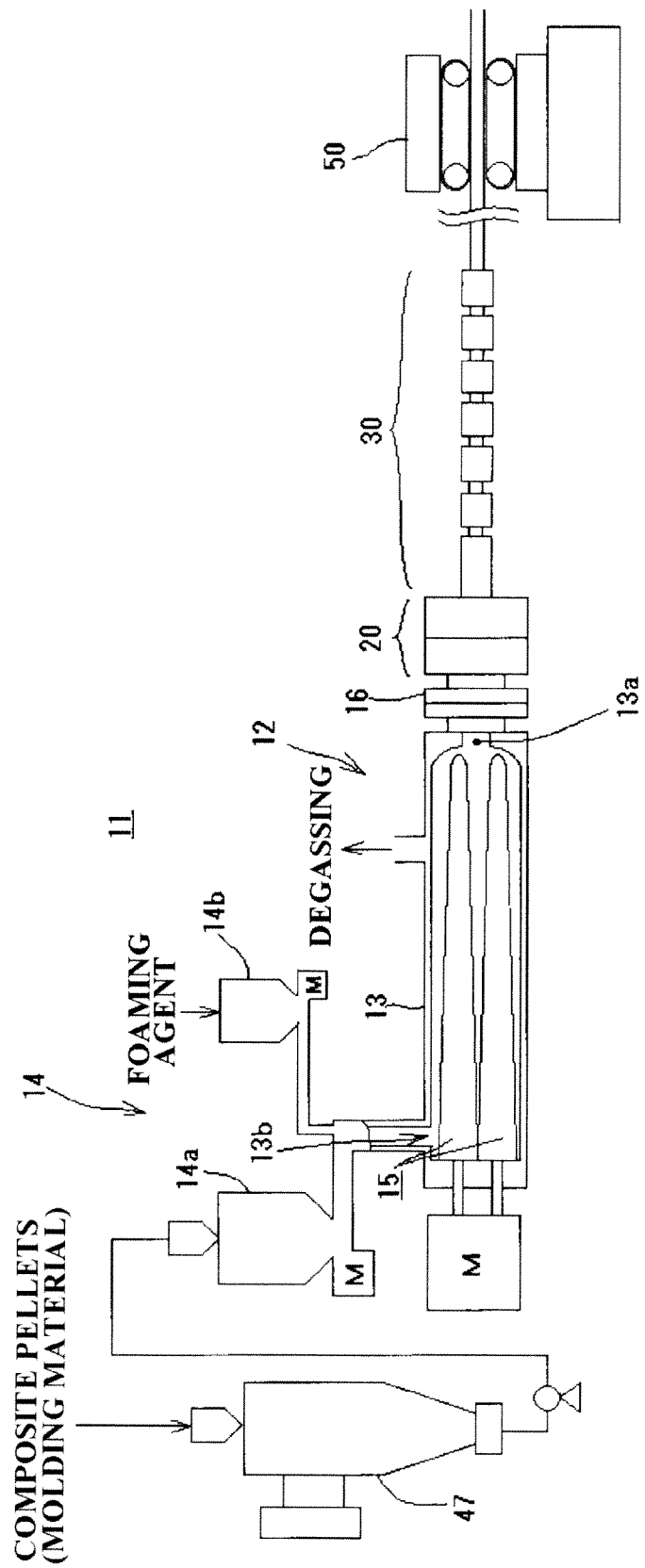
FIG. 4 is an outline drawing illustrating an extrusion apparatus used for a manufacturing test of a synthetic wood product (synthetic wood board) with composite pellets of Examples and Comparative Examples according to Embodiment 1.

Before such extrusion is performed, the manufactured composite pellets are dried sufficiently as required using, for example, a dryer 47, as shown in FIG. 4.

It is preferable that the composite pellets be dried until a moisture content of 0.2 mass % or less is reached. Although the drying method is not particularly limited, the composite pellets were dried for more than two hours using a hot dryer at a temperature of 120° C. until the above-described moisture content was reached, for example, in this embodiment.

Foaming Agent

As described above, when the composite pellets obtained by the method of the present invention are to be used for extrusion foam molding, these composite pellets are delivered into the extruder for extrusion together with a foaming agent.

The types of foaming agents used for such foam molding include volatile foaming agents in the form of either gas (e.g., $CO_2$, $N_2$, chlorofluorocarbon, and propane are normally gaseous) or liquid and degradable foaming agents. Either type of foaming agent, including various types of commercially available foaming agent, can be used. In this embodiment, a degradable foaming agent is used.

Degradable foaming agents include nonorganic compounds, azo compounds, sulfonyl hydrazide compounds, nitroso compounds, azide compounds, and so forth. Any type of these foaming agents can be used as long as it readily disperses or dissolves in the thermoplastic resin, serving as a main raw material of the molding materials, and does not stain the obtained wood molded foam with unwanted color etc.

Furthermore, pellet-shaped foaming agents prepared by deeply doping a carrier resin with a foaming agent, so-called a "master batch," are also commercially available and can be used.

In this embodiment, a master batch containing PE as a carrier resin and sodium bicarbonate belonging to nonorganic compounds was used as a foaming agent.

The foaming agent to be used is added in the required amount, according to the volume of gas generated thereby, the extent of foaming of the molded foam to be manufactured, and so forth. For example, the added amount of the foaming agent (master batch) in this embodiment is preferably 0.3 to 5 mass %, and more preferably 0.5 to 3 mass %, relative to the total of the composite pellets and the foaming agent as 100 mass %.

The composite pellets having the foaming agent added thereto in this manner are then continuously introduced into the screw extruder 12 provided in the extrusion apparatus 11 and melt-kneaded while being heated. The molding materials extruded by this extruder 12 are introduced into an extrusion die 20 and then into the molding die 30, continued with this extrusion die 20, which forms the molding materials into a predetermined shape. The materials formed into a predetermined shape are cooled and hardened to produce a wood molded foam of a desired shape.

Extrusion Apparatus

Various types of apparatuses can be employed as an extrusion apparatuses used to manufacture the wood molded foam. An example structure of the extrusion apparatus 11 used to extrude the composite pellets according to the present invention will be described as an example with reference to the drawings.

The extrusion apparatus 11 shown in FIG. 4 includes the feeder 14 that supplies the composite pellets, according to the present invention, obtained in the above-described step and the master batch as a foaming agent by respective constant amounts; the screw extruder 12 that melt-kneads and extrudes the composite pellets and the foaming agent supplied through this feeder 14; the extrusion die 20 that introduces the extrusion materials extruded by the above-described extruder 12; the molding die 30 that forms the molding materials that have passed through the above-described extrusion die 20 into a predetermined shape and cools and hardens those molding materials; and the collection machine 50 that collects the extrusion materials (wood molded foam) that have been cooled and hardened after having passed through the molding die 30.

Feeder

The above-described feeder 14 includes a feeder 14a that supplies the extruder 12 with the composite pellets, according to the present invention, obtained as described above by a constant amount at a time: and a foaming agent feeder 14b that merges, by a constant amount at a time, the foaming agent, in the form of a master batch, according to this embodiment with the composite pellets transported towards the extruder 12 by this feeder 14a. After the composite pellets and the foaming agent are delivered into the hoppers provided in the above-described feeders 14a and 14b, respectively, the composite pellets and the foaming agent, serving as molding materials, can be supplied to the extruder 12 at a predetermined compounding ratio through the rotation of feed screws (not shown in the figure) driven by the motors M provided below these hoppers.

Extruder

The extruder 12 into which the composite pellets and foaming agent are delivered in this manner is of a screw type provided with the screws 15, which heat-knead the mixture of the composite pellets and the foaming agent, serving as molding materials, into melted and plasticized molding materials and then extrude the molding materials. Although this embodiment is described by way of an example where the biaxial screw extruder 12 is employed as the extrusion apparatus 11, various types of screw extruders, such as a uniaxial screw extruder, a multiaxial extruder, or a screw extruder with these types in combination, can be used.

A biaxial screw extruder is highly advantageous in dispersing the raw materials because of its features of high extrusion force due to the engagement structure of the screws 15 and a specific kneading effect, as described above. Furthermore, a biaxial screw extruder can prevent the temperature of materials from increasing due to friction because it is able to produce a necessary extrusion force even with a low rotational frequency, making it easy to control the temperature of the materials with, for example, a heater (not shown in the figure) provided on the outer circumference of a cylinder 13 of the extruder 12. Therefore, a biaxial screw extruder is preferably used as the extruder 12 of the extrusion apparatus 11.

The biaxial screw extruder 12 shown in FIG. 4 includes the cylinder 13; the pair of screws 15 rotatably provided in the cylinder 13; and a driving source M, composed of a speed reducer, a motor, and so forth, that rotationally drives the screws 15. Furthermore, the extrusion die 20 and molding die 30 are provided at the front end of the cylinder 13 (front in the extrusion direction, or right-hand side on the drawing of FIG. 4).

The cylinder 13 is formed in a tubular shape, whose front end in the extrusion direction is open to form an outlet 13a and whose rear end (rear in the extrusion direction, or left-hand side on the drawing of FIG. 4) is closed. A delivery opening 13b through which the raw materials are delivered and that penetrates the cylinder 13 is provided at the upper portion of the rear end. Through this delivery opening 13b, the mixed materials of the composite pellets and the foaming agent are delivered by the above-described feeder 14.

At the outer circumferential portion of the cylinder 13, heating means (not shown in the figure), such as a band heater, are provided over the entire length of the cylinder 13 so as to wind or surround the cylinder 13, and the mixed materials supplied into the cylinder 13 are heated by this heating means.

Each of the screws 15 includes a round-bar-shaped revolving shaft; and a screw element constituting the screw thread portion of the screws 15 such that the screw element is integrally and helically provided around this revolving shaft. The revolving shaft provided at the rear end (left-hand side on the drawing of FIG. 4) of each screw 15 protrudes backwards from the rear end of the cylinder 13, and the protrusion is linked to the motor M serving as a driving source. The screws 15 are a biaxial conical screw of a shape tapering towards its front end and reversely rotate by the driving source, with an angled screw threads and screw grooves formed thereon engaging with each other.

When the screws 15 are rotationally driven through the operation of the driving source M, the mixed materials supplied into the cylinder 13 through the feeder 14 are pumped along the groove between the screw portions of the screws 15 towards the front end of the screws 15 while being heat-kneaded, turn into molten and plasticized molding materials, and are extruded from the front ends of the screws 15 out of the cylinder 13 by the extrusion force applied to the molding materials.

Molding Die and Collection Machine

The molding materials extruded by the extruder 12 in this manner are introduced into the extrusion die 20, formed into a predetermined shape. The molding materials extruded through the extrusion die 20 are cooled and hardened when passing through the molding die 30 and formed into a synthetic wood product, which is collected by the collection machine 50 at predetermined collection speed, thus manufacturing an elongated synthetic wood product, i.e., a synthetic wood board in the case of the embodiment shown in the figure.

The synthetic wood product (synthetic wood board) obtained in this manner is cut at predetermined intervals in the longitudinal direction for use, for example, as a floor material of a wood deck.

Embodiment 1

A composite-pellet manufacturing test example based on the manufacturing method according to the present invention, as well as a synthetic wood product (board) manufacturing test example using the composite pellets obtained based on the composite-pellet manufacturing test example will be described below.

1. Manufacturing Test of Composite Pellets 1-1. Test Example 1

(1) Purpose of Test

The linear velocity vd (cm/sec) is changed by changing the extrusion rate Q (kg/Hr) of the extruder provided in the composite-pellet manufacturing apparatus, the diameters D (mm) of the nozzle holes, and the number n of nozzle holes to check changes seen in the shape and characteristics of the obtained composite pellets.

(2) Test Method (2-1) Composition of Raw Materials

The composition of the raw materials used in Test 1 is shown in Table 1 below.

TABLE 1

Composition of the raw materials used in Test example 1

| Component | Manufacturer etc. | Compounding ratio (mass %) |
|---|---|---|
| PP | Prime Polymer Co., Ltd., "P102" MI = 1 | 20.0 |
| PP | SunAllomer Ltd., "PM500Z" MI = 3 | 10.0 |
| PP (recycled bottle caps) | Taiho Chemical Co., Ltd., MI = 10 | 10.0 |
| Wood meal | Kaneki, "A-100" grain size of 50 to 200 μm | 45.0 |
| Talc | Fuji Talc Industrial Co., Ltd., "SP-40" average grain size of 23 μm | 10.0 |
| Reinforcing agent (maleic modified PP) | Sanyo Chemical Industries, Ltd., "Yumex 1010" | 0.4 |
| Pigment (brown) | Nikko Bics Co., Ltd., "P0-ET2782B" | 2.5 |
| Paraffin wax | Mitsui Hi-WAX "HW200P" | 2.1 |
| Total | | 100.0 |

Density of molten material (ρm) = 1.15 g/cm³
"MI" in the Table stands for Melt Index.

In the above table, the value 1.15 g/cm³, representing the density (ρm) of the molten materials, was calculated using the following expression:

$$100/\rho m = (40/\rho_{PP}) + (45/\rho_{WP}) + (10/\rho_{ta}) + (5/\rho_{ot})$$

where,
$\rho_{PP}$ represents the specific gravity of polypropylene (PP),
$\rho_{WP}$ represents the absolute specific gravity of the wood meal,
$\rho_{ta}$ represents the absolute specific gravity of talc, and
$\rho_{ot}$ represents the specific gravities of other substances.
The absolute specific gravity was used to calculate ρm for the wood meal and talc because when the materials of the composition shown above are in a melted state, the PP, par- affin wax, reinforcing agent, and so forth impregnate the holes of the wood meal or talc.

In the materials used in the example above, $$\rho_{PP}=0.9, \rho_{WP}=1.3, \rho_{ta}=2.7, \rho_{ot}=1.17.$$

Therefore, $$100/\rho m = (40/0.9) + (45/1.3) + (10/2.7) + (5/1.17) \approx 87.04,$$
and $$\rho m = 100/87.04 \approx 1.15 (g/cm^3).$$

(2-2) Apparatus for Manufacturing Composite Pellets

The overall structure of the apparatus is shown in FIG. 5.

The materials were introduced through an inlet portion 33 in the cylinder of the extruder shown in FIG. 5, and the setting temperatures of the cylinder downstream of the material introduction point were 150 to 170° C. in a heating section 34, 170 to 200° C. in a kneading section 35, and 110 to 200° C. in a constant-amount supply section 36.

The strands of molten resin extruded by the die nozzle provided on the front end of the cylinder of the extruder were sprayed with hot water (hot water shower) and then subjected to hot cutting. The obtained pellets were dried through centrifugal separation and collected.

The vent hole provided in the constant-amount supply section 36 of the cylinder was connected to a vacuum pump, and evacuation was performed for additional venting.

(3) Test Results

Table 2 lists the conditions including the extrusion rate Q, the diameters D of the nozzle holes of the die nozzle, and the number n of nozzle holes; changes in the linear velocity vd according to these conditions; and changes in the shape and characteristics made to the manufactured composite pellets as a result of such changes in the linear velocity vd for the Examples (Examples 1 to 4) and Comparative Examples (Comparative Examples 1 to 3).

TABLE 2

Results of Test example 1

Figure 7:
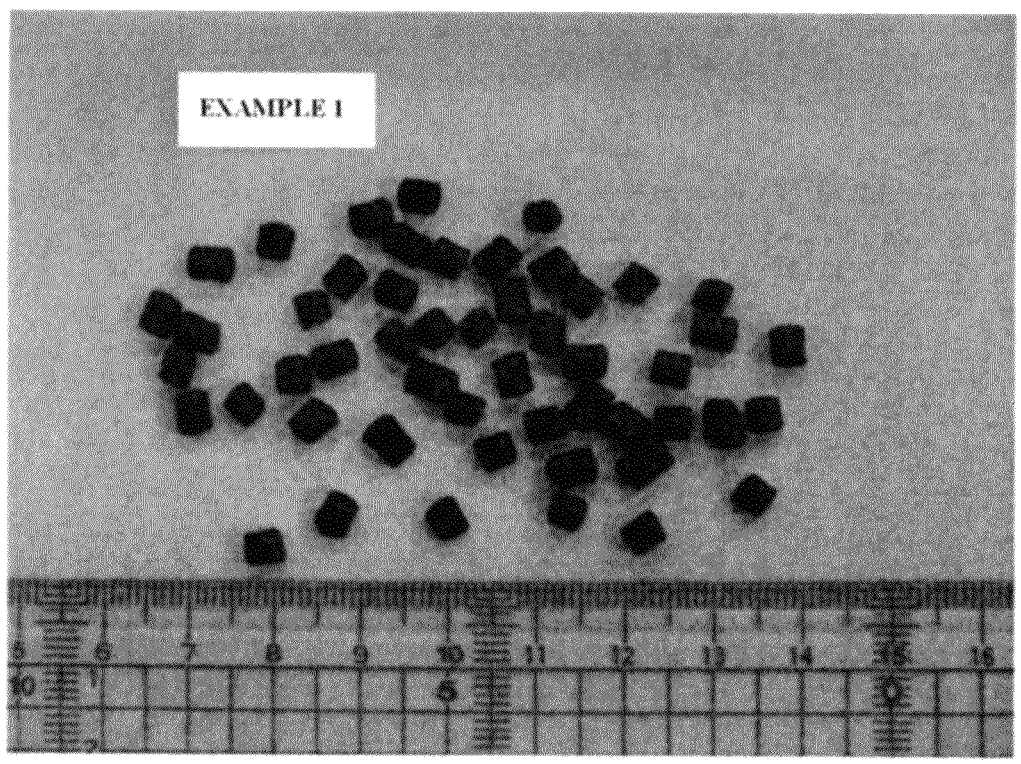
FIG. 7 is a photo showing the particle structure of composite pellets in Example 1 according to Embodiment 1.
Figure 8:
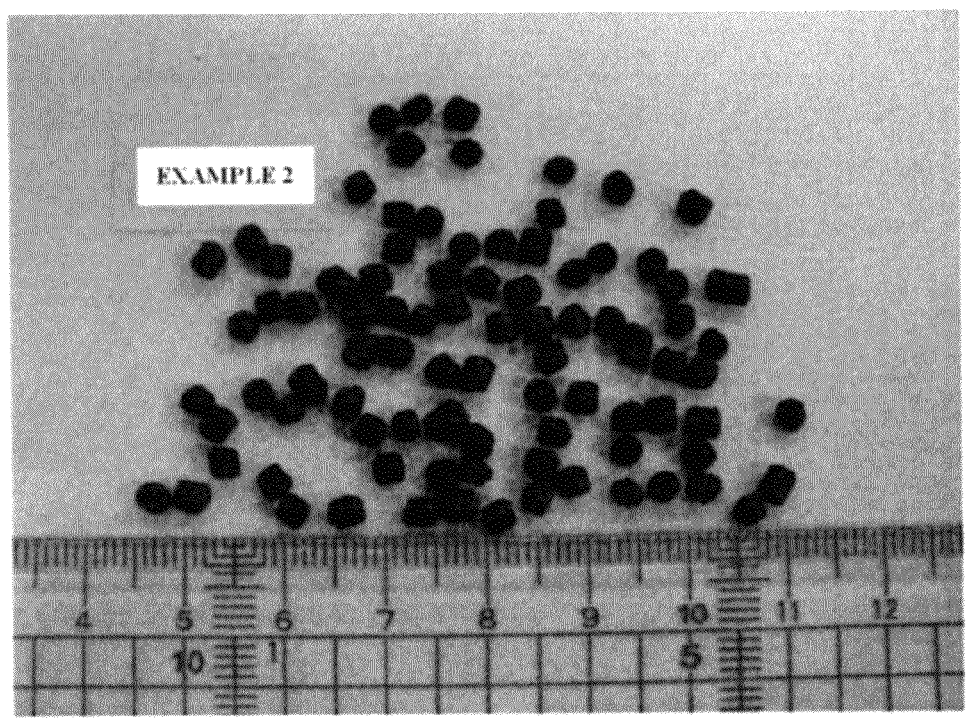
FIG. 8 is a photo showing the particle structure of composite pellets in Example 2 according to Embodiment 1.
Figure 9:
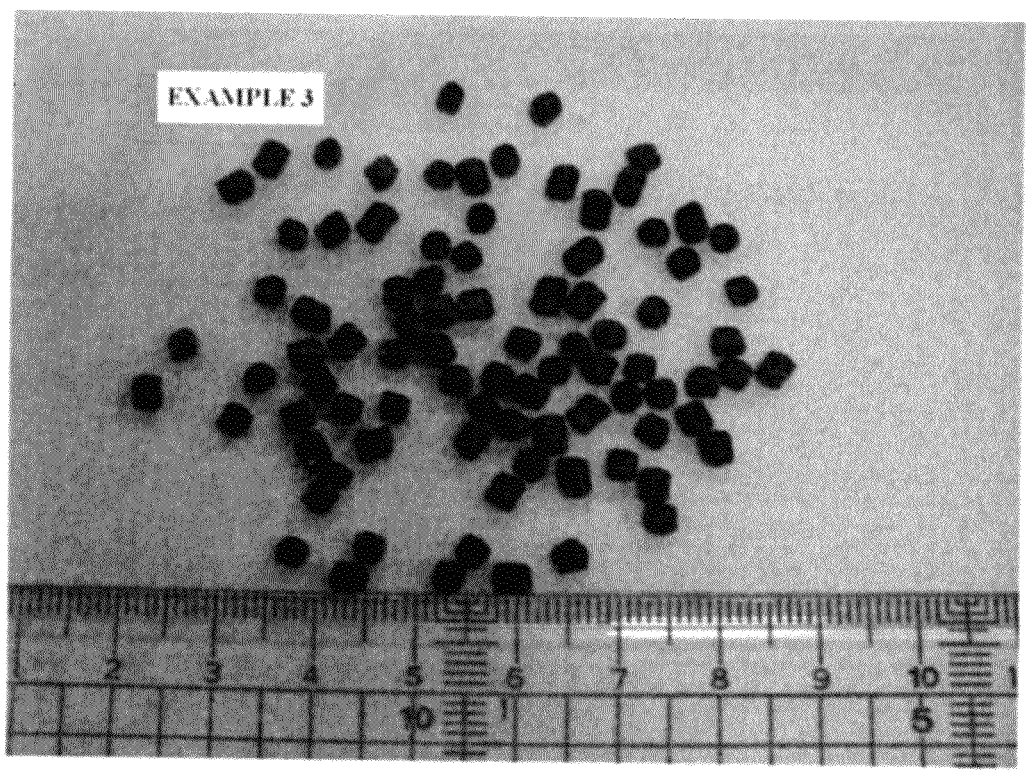
FIG. 9 is a photo showing the particle structure of composite pellets in Example 3 according to Embodiment 1.
Figure 11:
FIG. 11 is a photo showing the particle structure of composite pellets in Comparative Example 1 according to Embodiment 1.
Figure 12:
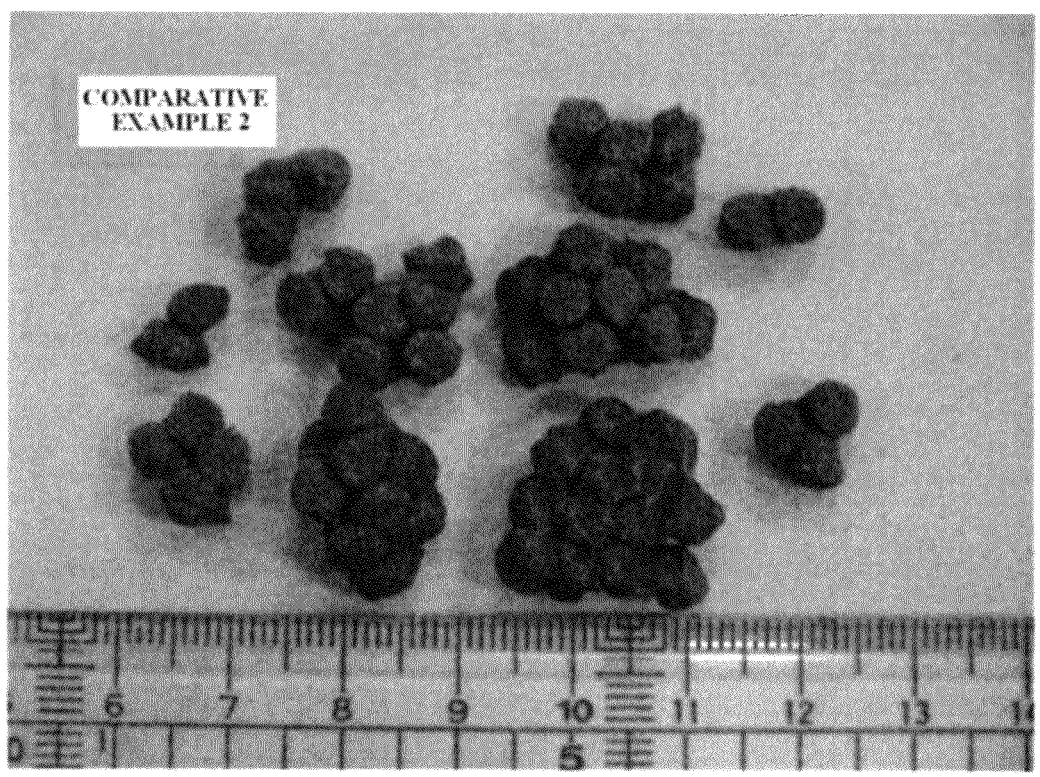
FIG. 12 is a photo showing the particle structure of composite pellets in Comparative Example 2 according to Embodiment 1.
Figure 13:
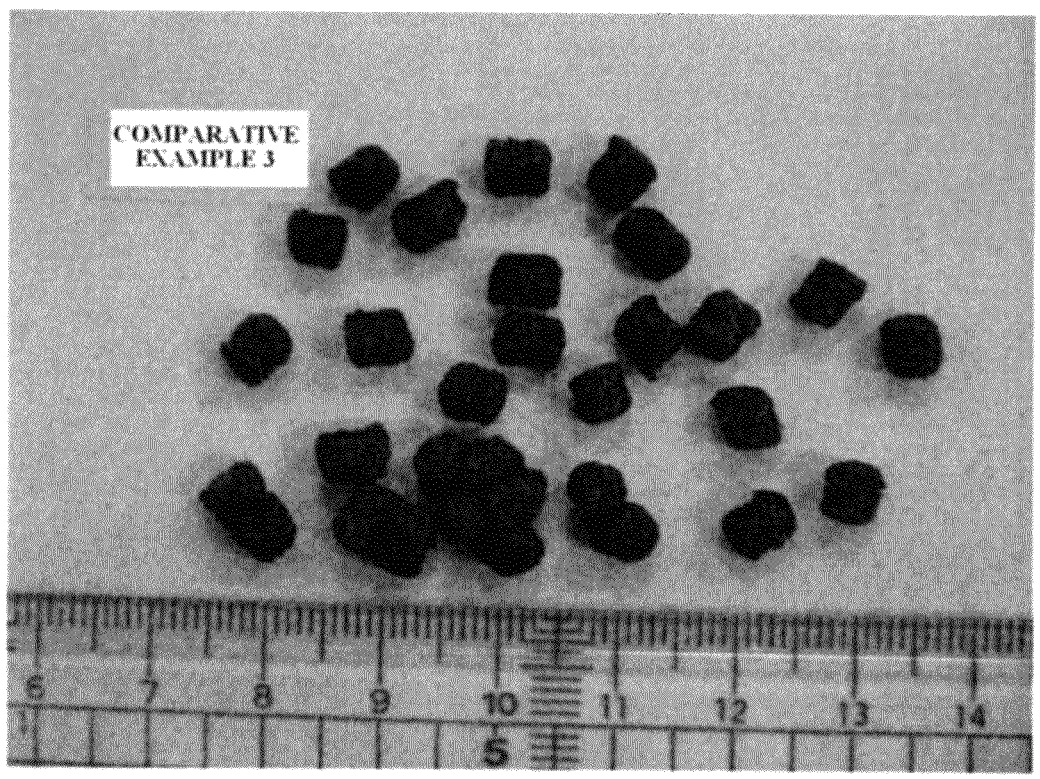
FIG. 13 is a photo showing the particle structure of composite pellets in Comparative Example 3 according to Embodiment 1.

| | Value setting | | | Shape and characteristics of composite pellets | | | |
|---|---|---|---|---|---|---|---|
| | Extrusion rate Q (kg/Hr) | Nozzle hole $\phi$ D (mm) × No. of holes n | Linear velocity vd (cm/sec) | Pellet size $\phi$ × L (mm) | Bulk density (g/cm$^3$) | Pellets fused | Figs. showing particles |
| Comparative Example 1 | 250 | 4.0 × 71 | 6.8 | 4.5 × 5.5 | 0.45 | Yes | FIG. 11 |
| Comparative Example 2 | 300 | 4.0 × 71 | 9.0 | 4.6 × 5.0 | 0.55 | Yes | FIG. 12 |
| Example 1 | 400 | 4.0 × 32 | 23.8 | 3.5 × 4.0 | 0.66 | No | FIG. 7 |
| Example 2 | 400 | 3.0 × 56 | 24.4 | 2.5 × 3.0 | 0.68 | No | FIG. 8 |
| Example 3 | 400 | 3.0 × 40 | 34.2 | 2.5 × 3.0 | 0.68 | No | FIG. 9 |
| Example 4 | 500 | 3.0 × 40 | 42.8 | 2.5 × 3.5 | 0.68 | No | — |
| Comparative Example 3 | 500 | 3.0 × 30 | 57.0 | 2.5 × 6.0 | 0.55 | Yes | FIG. 13 |

For the bulk density of pellets listed in Table 2 above, a 1-liter-capacity measuring cylinder was filled with the obtained pellets in a non-pressurized state, the total weight (g) of the pellets placed in this measuring cylinder was obtained, and then the bulk density was calculated as a value calculated as "total weight (g)/1000 (cm$^3$)."

1-2. Test Example 2

(1) Purpose of Test

The linear velocity vd (cm/sec) is changed by changing the extrusion rate Q (kg/Hr), assuming that the diameters D and the number n of nozzle holes of the die nozzle to be used are constant, to observe changes in the shape and nature of the composite pellets when the linear velocity vd is near the lower limit of the value range according to the present invention.

(2) Test Method

(2-1) Composition of the Raw Materials

The composition of the raw materials used in the experiment are shown in Table 3.

TABLE 3

Composition of the raw materials used in Test example 2

| Component | Manufacturer etc. | Compounding ratio (mass %) |
|---|---|---|
| PP | Prime Polymer Co., Ltd., "P102" MI = 1 | 20.0 |
| PP (recycled bottle caps) | Taiho Chemical Co., Ltd., MI = 10 | 10.0 |
| PP (recycled material) | Tsurui material, MI = 8 | 10.0 |
| Wood meal | Kaneki, "A-100" grain size of 50 to 200 μm | 45.0 |
| Talc | Fuji Talc Industrial Co., Ltd., "SP-40" average grain size of 23 μm | 10.0 |
| Reinforcing agent (maleic modified PP) | Sanyo Chemical Industries, Ltd., "Yumex 1010" | 0.4 |
| Pigment (brown) | Nikko Bics Co., Ltd., "P0-ET2782B" | 2.5 |
| Paraffin wax | Mitsui Hi-WAX "HW200P" | 2.1 |
| Total | | 100.0 |

Density of molten material ($\rho$m) = 1.15 g/cm$^3$
"MI" in the Table stands for Melt Index.

The molten materials melt-kneaded by the screws in the cylinder can be further pressurized by this gear pump and introduced into the die nozzle via a two-way valve so that the rate of extrusion is made constant.

(2-2) Apparatus for Manufacturing Composite Pellets

The apparatus for manufacturing composite pellets used in this Test example is a biaxial extruder, like the one shown in FIG. 5.

The molten materials introduced into the die nozzle at the front end of the cylinder of this biaxial extruder were extruded as strands through the nozzle holes, and the extruded strands of molten materials were subjected to underwater cutting.

The cylinder was divided into four segments in the longitudinal direction, as shown in FIG. 5, for the setting temperatures of the cylinder in the extruder. The setting temperature in each segment is as shown in Test example 1.

Introduction of the raw materials into the cylinder of the extruder is performed by introducing the raw materials containing wood meal (resin, talc, pigment, and paraffin wax) through the inlet portion 33 of the cylinder.

In addition, the vent hole provided in the constant-amount supply section 36 was connected to a vacuum pump, and evacuation was performed for additional venting.

(3) Test Results

Table 4 below lists the conditions including the extrusion rate Q and the linear velocity vd in the Examples (Examples 5 and 6) based on Test example 2 and observation results of the shapes and characteristics of the composite pellets obtained under these conditions.

invention, the composite pellets obtained at a linear velocity above the predetermined linear velocity were found to exhibit a low bulk density (refer to Table 2).

TABLE 4

Results of Test example 2

Figure 10:
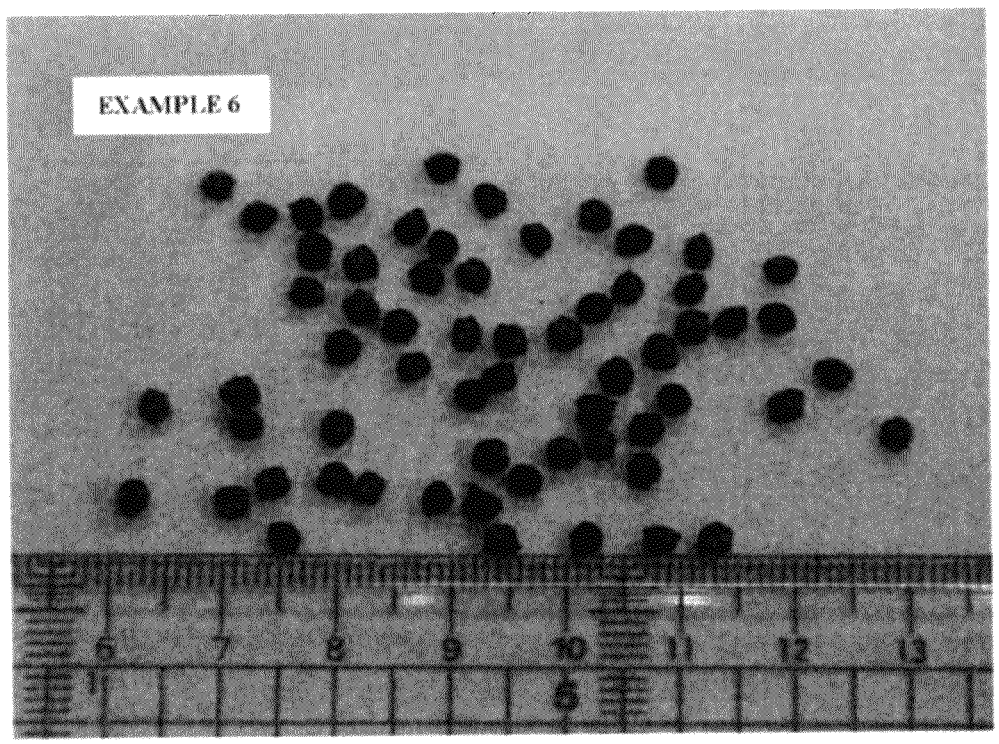
FIG. 10 is a photo showing the particle structure of composite pellets in Example 6 according to Embodiment 1.

| | Value setting | | | Shape and characteristics of composite pellets | | | |
|---|---|---|---|---|---|---|---|
| | Extrusion rate Q (kg/Hr) | Nozzle hole $\phi$ D (mm) × No. of holes n | Linear velocity vd (cm/sec) | Pellet size $\phi$ × L (mm) | Bulk density (g/cm$^3$) | Pellets fused | Figs. showing particles |
| Example 5 | 300 | 4.0 × 48 | 12.0 | 3.9 × 3.5 | 0.59 | Slightly | — |
| Example 6 | 400 | 4.0 × 48 | 16.0 | 2.3 × 2.5 | 0.68 | No | FIG. 10 |

Measurement of the bulk density of pellets in Table 4 was performed in the same manner as in Test example 1.

1-3. Evaluation Based on Test Examples 1 and 2

From the test results above, the composite pellets obtained at a linear velocity within the predetermined range of the linear velocity vd (cm/sec) according to the present invention (Examples 1 to 4) had uniform shapes, were separated from one another, and had a relatively high bulk density (refer to FIGS. 7, 8, and 9 for Examples 1 to 3).

Furthermore, the diameters of the individual pellets were smaller than the diameters D of the nozzle holes provided in the die nozzle. In addition, no voids were found in the obtained pellets.

On the other hand, the composite pellets (Comparative Examples 1 and 2) obtained at a linear velocity (vd<12) below the predetermined linear velocity vd according to the present invention were found fused to one another. More specifically, many masses each composed of about 2 to 15 pellets adhering to one another were generated (refer to FIGS. 11 and 12).

Furthermore, the composite pellets obtained at a linear velocity (vd<12) below the predetermined linear velocity vd according to the present invention had a larger diameter than the diameters D of the nozzle holes provided in the die nozzle, and many of such composite pellets had voids formed therein and had a relatively low bulk density.

The trend that the lower the linear velocity vd, the larger the pellet diameter is apparent from the results of Test examples 1 and 2.

From the results of Test example 2, the pellet diameter, 3.90 mm, was slightly smaller than the diameters of the nozzle holes, of 4.0 mm, for Example 5 where the linear velocity vd was 12 cm/sec. Furthermore, because the magnitude correlation between the diameters of nozzle holes and the pellet diameters is presumed to reverse when the linear velocity vd is below 12 cm/sec, a velocity of 12 cm/sec can be safely set as the lower limit of the linear velocity vd at which the strands can be prevented from inflating due to the Barus effect.

When pellets were manufactured at a linear velocity (vd>50) above the predetermined linear velocity according to the present invention (Comparative Example 3), the pellets were found adhering to one another, though the strands extruded through the die nozzles were prevented from inflating, and pellets having diameters smaller than the diameters of the nozzle holes in the die nozzle were obtained.

Furthermore, compared with the pellets manufactured at the predetermined linear velocity according to the present invention, the composite pellets obtained at a linear velocity above the predetermined linear velocity were found to exhibit a low bulk density (refer to Table 2).

2. Manufacturing Test of Synthetic Wood Board 2-1. Purpose of Test

A foamed synthetic wood board is manufactured using composite pellets obtained at a linear velocity within the range of the predetermined linear velocity vd according to the present invention (Examples 2 and 4 above) and composite pellets obtained at a linear velocity below the predetermined linear velocity vd according to the present invention (Comparative Examples 1 and 2 above) to see how the performance of a synthetic wood product (foamed synthetic wood board) as the final article is affected by the differences in composite pellets.

2-2. Test Method (Extrusion Foam Molding Conditions)

Extrusion foam molding was performed with the extrusion apparatus by using the composite pellets obtained in Examples 2 and 4 and Comparative Examples 1 and 2 above.

In all examples, Eiwa Chemical Ind. Co., Ltd. "Polythlene EE405F" (master batch prepared by adding sodium bicarbonate to PE as a carrier resin) was used as the foaming agent.

The outline structure of the employed extrusion apparatus is the same as that of the extrusion apparatus described with reference to FIG. 4, and the conical counter-rotating twin screw extruder "T-58" manufactured by Cincinnati Extrusion was employed as the extruder 12 of this extrusion apparatus 11.

Before the composite pellets were delivered into the extruder 12, the composite pellets obtained in Examples 2 and 4 and Comparative Examples 1 and 2 were dried with a hot dryer at 120° C. for more than two hours until a moisture content of 0.2% or lower was achieved. Subsequently, the composite pellets were delivered into the extruder together with the above-described foaming agent.

The extrusion temperatures (setting temperatures of the extruder 12 through the extrusion die 20) were set at 175 to 190° C., and the molding die 30 had a water-cooling jacket at 20° C.

In addition, during molding, the air vent provided in the cylinder 13 of the extruder 12 was opened to the atmosphere, instead of evacuating through the air vent.

Figure 6:
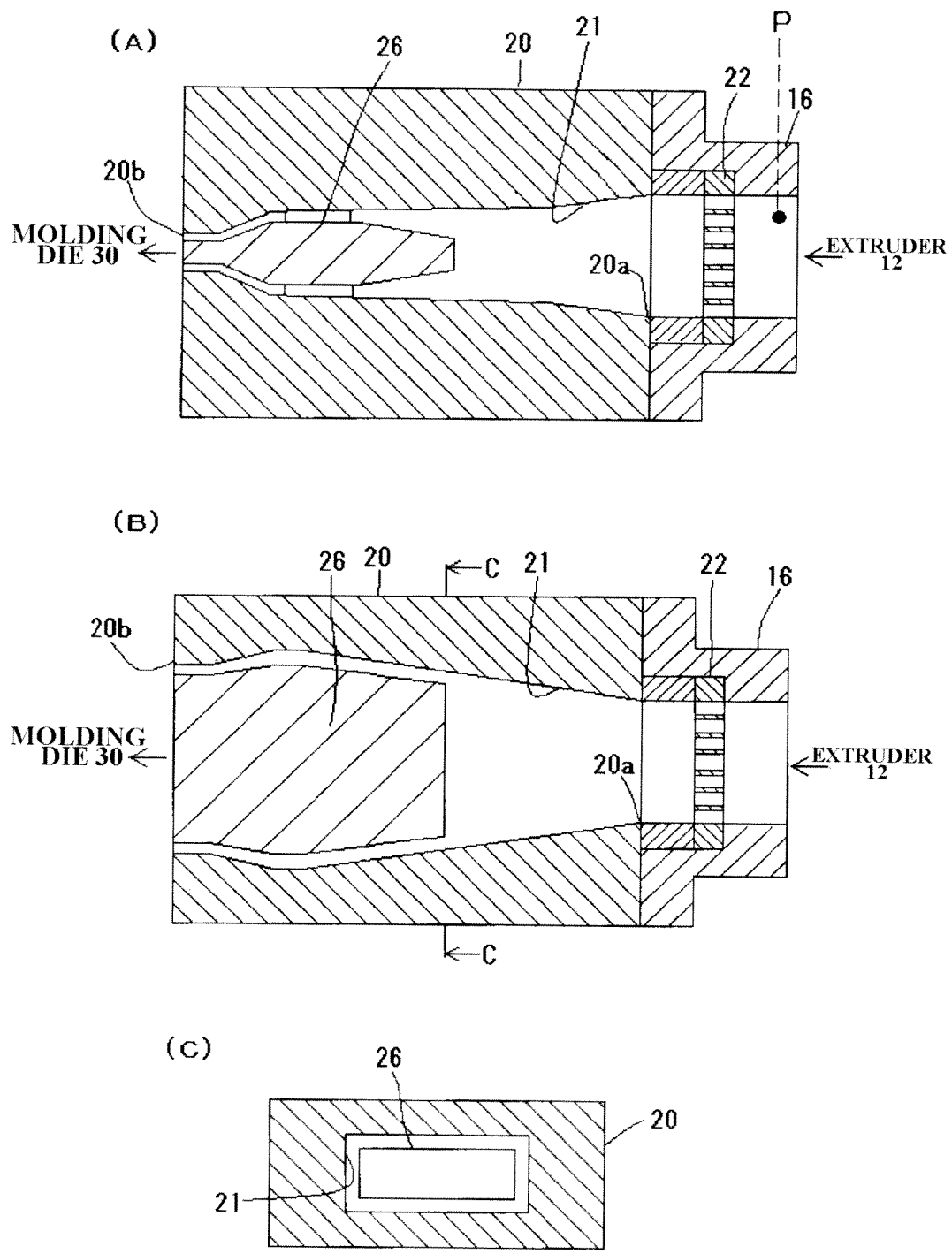
FIG. 6 include cross-sectional views of an extrusion die mounted at the front end of the extruder of the extrusion apparatus shown in FIG. 4, (A) showing a cross section in side view, (B) showing a cross section in plan view, and (C) showing a cross section taken along line C-C of (B).

The extrusion die 20 shown in FIGS. 6(A) to (C) was mounted at the front end of the cylinder 13 of the extruder 12 via an adapter 16 provided with a breaker plate 22. This extrusion die 20 has a flow channel 21 formed therein such that the cross-sectional shape of the flow channel 21 taken along the width direction changes gradually from an inlet 20a of the shape matching the outlet of the cylinder of the extruder towards an outlet 20b (145 mm×25 mm) of the shape corresponding to the cross-sectional size of the foam-molded wood board. In this flow channel 21, a resistor body 26 of the shape shown in FIG. 6 that provides resistance against the flow of the molten materials flowing along that flow channel was installed.

Then, the molding die 30 including the above-described water-cooling jacket was provided so as to communicate with the outlet 20b of this extrusion die 20, and the molten materials extruded by the extrusion die 20 were cooled in the molding die 30 to produce continuously in the length direction wood molded foams in the form of a board with a width of 145 mm and a thickness of 25 mm.

2-3. Test Results

Manufacturing test results of the foam-molded wood board produced by the above-described method are shown in Table 5 below.

TABLE 5

Manufacturing test results of foam-molded wood board

| | Molding processability | | | | Physical properties of article (board) | |
|---|---|---|---|---|---|---|
| Pellets | Extrusion rate (kg/Hr) | Collection speed (m/Hr) | Variation range of die pressure (MPa) | Amount of foaming agent (mass %) | Density of article (g/cm$^3$) | Void present in cross section? |
| Comparative Example 1 | 70 | 20 | 1.1 to 1.7 | 0.8 to 1.5 | 0.88 to 1.0 | Yes (large) |
| Comparative Example 2 | 70 | 20 | 1.2 to 1.7 | 0.8 to 1.5 | 0.86 to 0.90 | Yes (large) |
| Example 2 | 70 | 20 | 1.5 to 1.7 | 0.8 | 0.83 to 0.85 | No |
| Example 4 | 70 | 20 | 1.5 to 1.7 | 0.8 | 0.82 to 0.85 | No |

In Table 5 above, the "variation range of the die pressure (MPa)" represents the maximum and minimum values of pressure changes in the extrusion die, measured at the points indicated by reference symbol P in FIG. 6(A).

Furthermore, in Table 5 above, the added amount of the foaming agent indicates the mass ratio (mass %) of the foaming agent (master batch), relative to the total mass counting the composite pellets and the foaming agent (master batch) as 100 mass %.

2-4. Consideration of Test Results (1) Variation Range of Die Pressure

In the case of extrusion foam molding performed with the pellets obtained in Examples 2 and 4, the pressure variation range in the extrusion die was found to be small, compared with the case of the extrusion foam molding performed with the pellets obtained in Comparative Examples 1 and 2.

From this, in the case of the pellets manufactured under the predetermined conditions according to the present invention, stable flow of the extrusion materials is achieved when those pellets are used for extrusion because the shape, size, physical properties, and so forth of the pellets are uniform. As a result, this stable flow is expected to achieve stable pressure in the extrusion die.

In particular, because of extrusion foam molding in which not only composite pellets but also a foaming agent is added in the case of this Test example, uniform distribution of the foaming gas is achieved in the extrusion materials when the molding materials obtained by the method of the present invention are used. As a result, this uniform distribution of the foaming gas is expected to stabilize the pressure in the extrusion die, thus narrowing the pressure variation range.

Furthermore, such a uniform distribution of the foaming gas can be confirmed also from the fact that the produced molded article (board) has no voids, which suggest local concentration of the foaming gas, formed therein.

Therefore, when composite pellets manufactured under the predetermined conditions according to the present invention are to be used, the molding processability during an extrusion molding process is found to be greatly improved, compared with the molding materials of Comparative Examples 1 and 2.

(2) Amount of Foaming Agent Added

In addition, in the examples of extrusion foam molding performed with the composite pellets of Examples 2 and 4, it was possible to stably produce a foam-molded article (board) with a density of 0.82 to 0.85 g/cm$^3$ by adding a 0.8 mass % foaming agent.

In contrast, in the examples of extrusion foam molding performed with the composite pellets of Comparative Examples 1 and 2, the densities of the article with the addition of 0.8 mass % foaming agent was 1.0 g/cm$^3$ in Comparative Example 1 and 0.9 g/cm$^3$ in Comparative Example 2, which are much higher than those of the foam-molded articles (boards) manufactured with the pellets of Examples 2 and 4.

In addition, in the examples of extrusion foam molding performed with the pellets of Comparative Examples 1 and 2, even when the added amount of the foaming agent is increased to 1.5 mass %, the minimum density of the article is 0.88 g/cm$^3$ in the example where the pellets of Comparative Example 1 were used and 0.86 g/cm$^3$ in the example where the pellets of Comparative Example 2 were used, which do not reach 0.85 g/cm$^3$, the maximum density of the particles in the examples where the pellets of Examples 2 and 4 were used.

It is clear from this that when the composite pellets obtained under the predetermined conditions according to the present invention are used, the effect of making a lightweight article by foaming can be brought about with a relatively small added amount of foaming agent.

(3) Summary

As described above, when extrusion, in particular, extrusion of foam molding is to be performed with the composite pellets manufactured under the conditions defined according to the present invention, not only is the molding processability of the produced article improved, but also the quality of the article can be enhanced, such as despite no generation of voids and a small density and light weight.

Embodiment 2

An example of manufacturing composite pellets according to the present invention will now be described, followed by test results regarding the performance of supply to the extruder and the clingability to the screw of the extruder in a case where the composite pellets obtained according to this manufacturing Test example are used.

Example of Manufacturing Composite Pellets

Composition of Raw Materials

Composite pellets on which 12HOS-M was to be deposited were manufactured with raw materials of the composition shown in Table 6 below.

TABLE 6

Composition of composite pellets (on which 12HOS-M was not deposited)

| Component | Manufacturer etc. | Compounding ratio (mass %) |
|---|---|---|
| PP | Prime Polymer Co., Ltd., "P-102" homopolymer MI = 1 | 19.92 |
| PP | SunAllomer Ltd., "EM500A" homopolymer MI = 3 | 9.96 |
| Pellets produced by recycling bottle caps | TAIHO CHEMICAL CO., LTD (PP/PE = 7/3) | 9.96 |
| Wood meal | Average grain size of 150 μm | 44.92 |
| Talc | Fuji Talc Industrial Co., Ltd., average grain size of 50 μm | 10.17 |
| Reinforcing agent (maleic modified PP) | Sanyo Chemical Industries, Ltd., "Yumex 1010" | 0.42 |
| Pigment (brown) | Nikko Bics Co., Ltd., "PO-ET2782C" | 2.54 |
| Paraffin wax | Mitsui Hi-WAX "HW200P" | 2.12 |
| Total | | 100.0 |

"MI" in the Table stands for Melt Index.

Apparatus for Manufacturing Composite Pellets
(Before Deposition of 12HOS-M)

Figure 14:
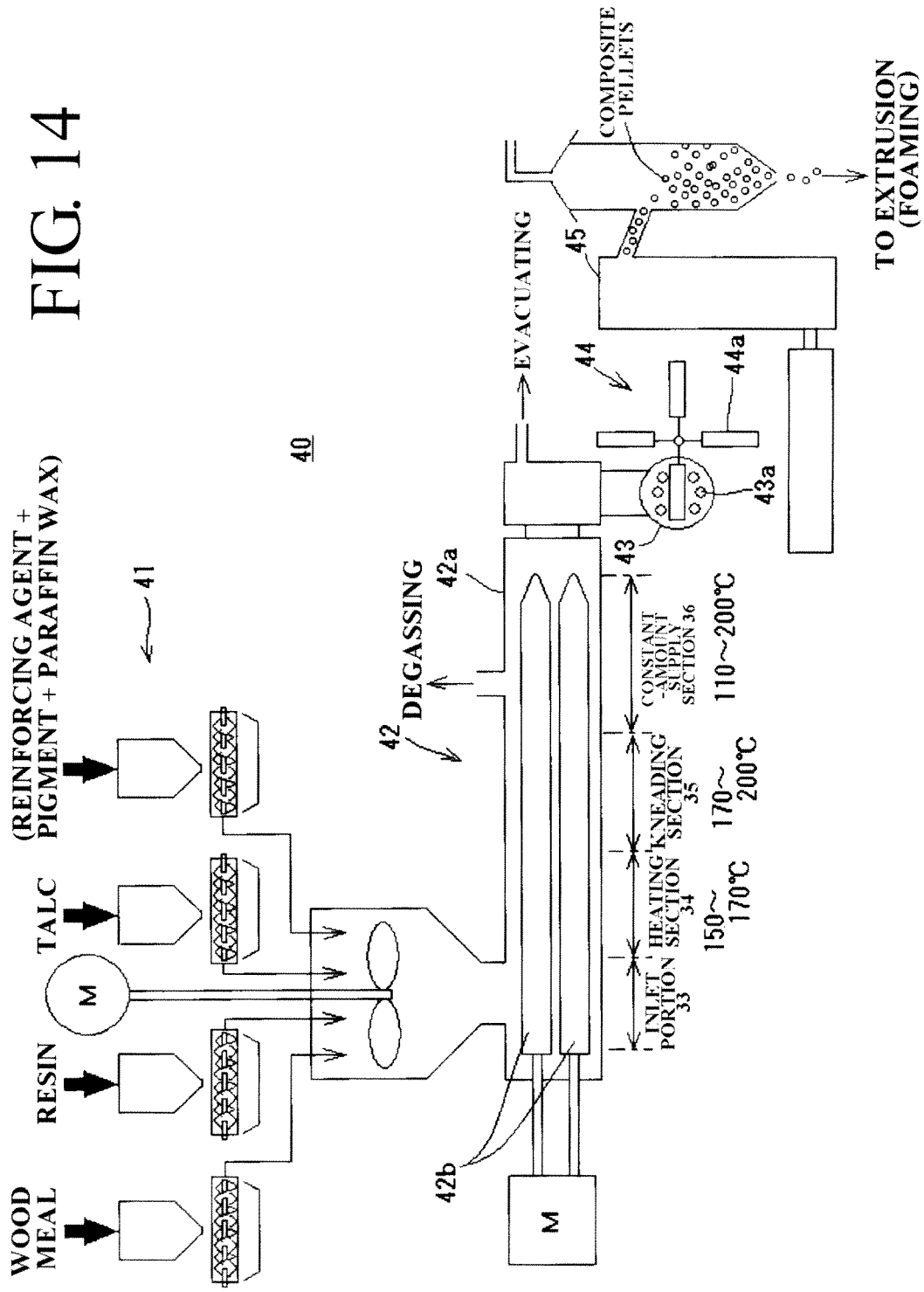
FIG. 14 is an outline drawing illustrating an apparatus for manufacturing composite pellets according to Embodiment 2.
Figure 15:
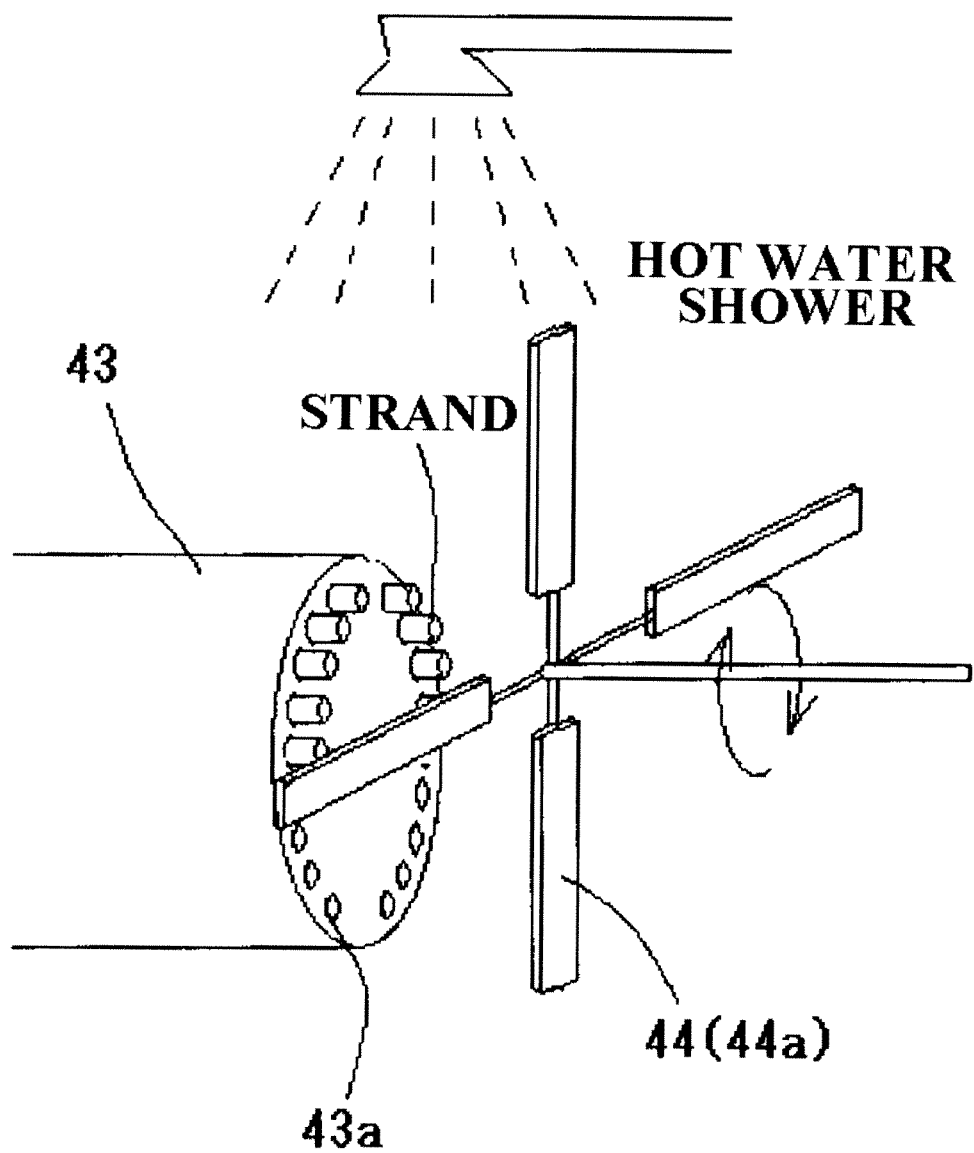
FIG. 15 is an illustration of cutting of strands according to Embodiment 2.

The outline of the apparatus for manufacturing composite pellets is shown in FIG. 14.

The materials pass through the feeder 41, are introduced into the heated cylinder 42a at the inlet portion 33 shown in FIG. 14, and are extruded through the die nozzle 43 provided at the front end of the cylinder 42a of the extruder 42 while being kneaded by the screws 42b.

The extruded strands of molten resin were sprayed with hot water (hot water shower) and subjected to hot cutting, and then the obtained pellets were dried with the centrifuge 45 and collected.

By the same method as described above, three types of composite pellets, A to C, shown in Table 7 below were obtained under different manufacturing conditions.

TABLE 7

Types of composite pellets (on which 12HOS-M was not deposited)

| Name of pellets | Extrusion rate (kg/Hr) | Nozzle used ϕ (mm) × No. of holes | Linear velocity (cm/sec) | Shape of pellets ϕ (mm) | Length (mm) | Bulk density (g/cm$^3$) |
|---|---|---|---|---|---|---|
| Pellets A | 280 | 4.0 × 30 | 17 | 4.0 | 4.0 | 0.60 |
| Pellets B | 400 | 4.0 × 32 | 23.8 | 3.5 | 3.5 | 0.656 |
| Pellets C | 400 | 3.0 × 56 | 24.4 | 2.8 | 3.0 | 0.665 |

In the above table, the term "rate of extrusion" denotes the rate of extrusion by the extruder 42 (refer to FIG. 14) used to manufacture the composite pellets.

In Table 7 above, the term "bulk density" of pellets denotes the value calculated as "total mass (g)/1000 (cm$^3$)", where the total mass is the total weight of the obtained pellets as placed in a 1 (one)-liter-capacity measuring cylinder in a nonpressurized state.

Deposition of 12HOS-CA

The three types of composite pellets obtained as described above were delivered in 300 kg lots into the sealed container 151 of the tumbler mixer 150 (for 500 kg), described with reference to FIG. 16, 12-hydroxystearic acid calcium salt (12HOS-Ca) as 12HOS-M was added such that its additive percentage was 0.03 to 0.4 mass % relative to the mass of the composite pellets as 100 wt %, and the sealed container 151 was rotated at a rotational speed of 20 min$^{-1}$ for 20 minutes to deposit 12HOS-Ca on the surfaces of the composite pellets by stirring the composite pellets.

Check Test of Constant-Amount Supply
Performance

Outline of Test Method

As described above, the composite pellets, according to the present invention, having 12HOS-Ca deposited thereon (Examples 7 to 14) and the composite pellets of Comparative Examples 4 to 11 were delivered into the feeder 14 of the extrusion apparatus 11, described with reference to FIG. 17, and the amount of composite pellets supplied from the feeder 14 to the extruder 12 was measured for comparative evaluation.

This feeder 14 is constructed so that the pellets of molding materials can be supplied to the extruder 12 by a predetermined amount at a time through the rotation of the feed screw driven by the motor M provided below the hopper. The amount of composite pellets supplied to the extruder can be changed by changing the rotational frequency of this motor.

Specimen (Composite Pellets)

Composite pellets (Examples 7 to 14 and Comparative Examples 4 to 11) used for the above-described check test of constant-amount supply performance are shown Table 8 below.

TABLE 8

List of specimens used for extrusion

| Specimen | Pellets used | Additive and amount |
|---|---|---|
| Example 7 | Pellets A | 12HOS-Ca 0.20 mass % |
| Example 8 | Pellets B | 12HOS-Ca 0.03 mass % |
| Example 9 | | 12HOS-Ca 0.05 mass % |
| Example 10 | | 12HOS-Ca 0.10 mass % |
| Example 11 | | 12HOS-Ca 0.20 mass % |
| Example 12 | | 12HOS-Ca 0.30 mass % |
| Example 13 | Pellets C | 12HOS-Ca 0.20 mass % |
| Example 14 | Pellets A + C (A/C = 1/1) | 12HOS-Ca 0.20 mass % |
| Comparative Example 4 | Pellets A | No additive used |
| Comparative Example 5 | | St-Ca 0.20 mass % |
| Comparative Example 6 | Pellets B | No additive used |
| Comparative Example 7 | | 12HOS-Ca 0.50 mass % |
| Comparative Example 8 | | 12HOS-Ca 1.00 mass % |
| Comparative Example 9 | Pellets C | No additive used |
| Comparative Example 10 | Pellets A + C | No additive used |
| Comparative Example 11 | (A/C = 1/1) | St-Ca 0.20 mass % |

Results of Measuring the Amount of Supply

The results of measuring the amount of composite pellets supplied from the feeder 14 to the extruder are shown in Table 9.

TABLE 9

Amount of pellets supplied to extruder

| Specimen | (Type of pellet/additive/ amount of deposition) | Rotational frequency of motor and amount of supply | | | | | Unit |
|---|---|---|---|---|---|---|---|
| | | 10 | 20 | 30 | 40 | 45 | min$^{-1}$ |
| Example 7 | A/12HOS-M/0.20 | — | 53 | 90 | 120 | 150 | kg/Hr |
| Example 8 | B/12HOS-M/0.03 | — | 59 | 86 | — | — | |
| Example 9 | B/12HOS-M/0.05 | — | 62 | 93 | — | — | |
| Example 10 | B/12HOS-M/0.10 | — | 64 | 94 | — | — | |
| Example 11 | B/12HOS-M/0.20 | — | 65 | 95 | 125 | 140 | |
| Example 12 | B/12HOS-M/0.30 | — | 64 | 95 | — | — | |
| Example 13 | C/12HOS-M/0.20 | 30 | 65 | 95 | 128 | — | |
| Example 14 | A + C/12HOS-M/0.20 | 30 | 62 | 93 | 125 | — | |
| Comparative Example 4 | A/no additive | — | 45 | 65 | 88 | 100 | kg/Hr |
| Comparative Example 5 | A/st-Ca/0.20 | — | 48 | 80 | 105 | 115 | |
| Comparative Example 6 | B/no additive | 30 | 58 | 87 | 115 | 130 | |
| Comparative Example 7 | B/12HOS-M/0.50 | — | 65 | 94 | — | — | |
| Comparative Example 8 | B/12HOS-M/1.00 | — | 65 | 95 | — | — | |
| Comparative Example 9 | C/no additive | 33 | 65 | 100 | 132 | — | |
| Comparative Example 10 | A + C/no additive | 25 | 50 | 75 | 100 | — | |
| Comparative Example 11 | A + C/st-Ca/0.20 | 28 | 55 | 85 | 110 | — | |

Figure 22:
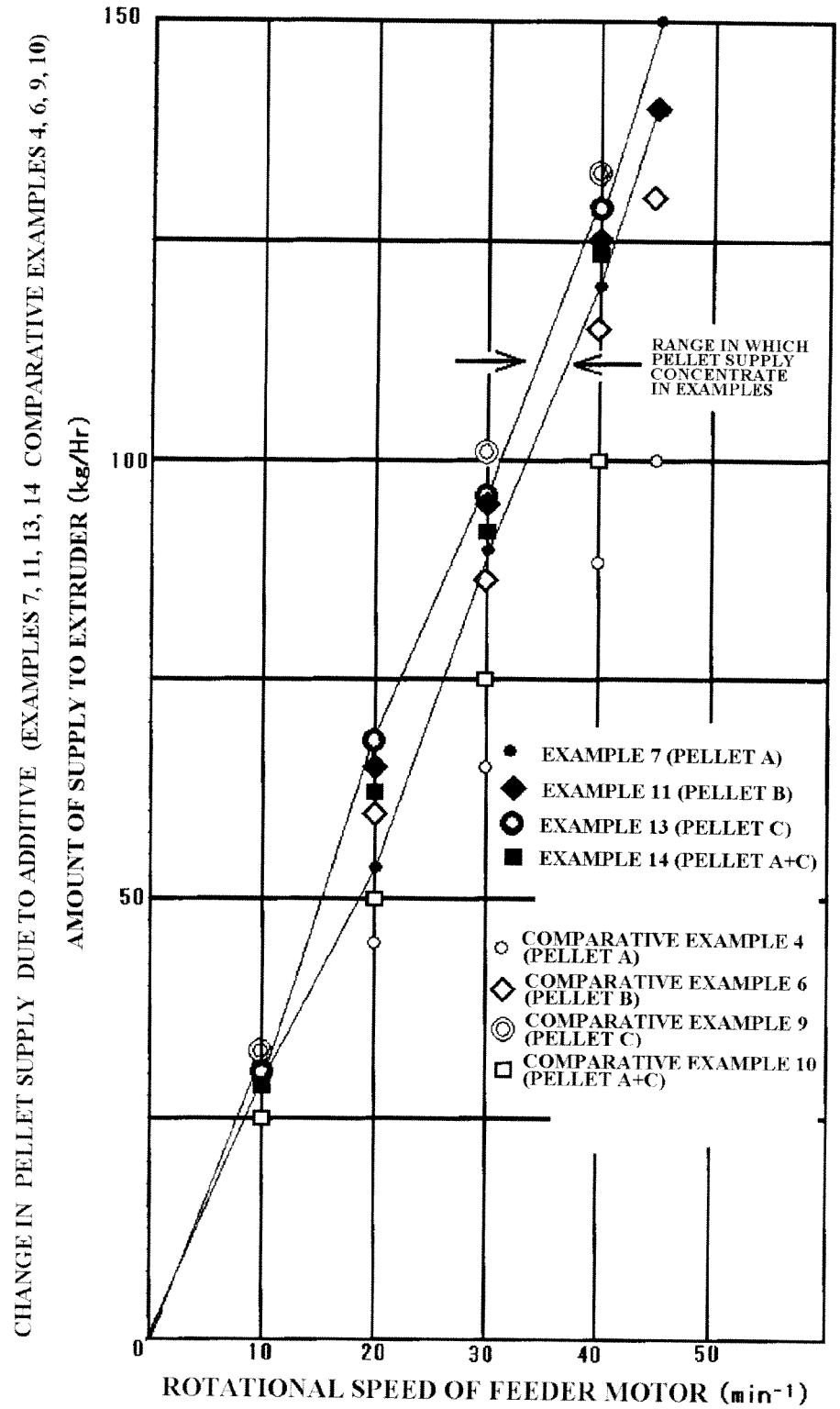
FIG. 22 is a graph showing changes in the amount of supplied pellets (Examples 7, 11, 13, 14 and Comparative Examples 4, 6, 9, 10) due to an additive (12HOS-Ca) of Embodiment 2.

Of the results described in Table 9 above, graphs of the measurement results in Example 7 and Comparative Example 4 (FIG. 18), Example 11 and Comparative Example 6 (FIG. 19), Example 13 and Comparative Example 9 (FIG. 20), and Example 14 and Comparative Example 10 (FIG. 21), each of the pairs sharing the same pellets as the base, are shown in FIGS. 18 to 21, respectively. A graph of Examples 7, 11, 13, and 14 and Comparative Examples 4, 6, 9, and 10 is shown on a single drawing of FIG. 22.

Consideration of Results

From the measurement results above, in any of the Examples and the Comparative Examples, the amount of composite pellets supplied increased linearly as the rotational speed of the motor M provided in the feeder 14 was increased.

In addition, for the pellets having no additive (12HOS-Ca) added thereto (Comparative Examples 4, 6, 9, and 10), the amount of supply decreased as the pellet size increased.

On the other hand, a comparison was made with the pellets having an additive (12HOS-Ca) added thereto (e.g., Examples 7, 11, 13, and 14, in which the added amount is 0.2 mass %). The amount of supply increased for relatively large pellets A and B (Examples 7 and 11), compared with the examples where no additive is added (Comparative Examples 4 and 6) (refer to FIGS. 18 and 19). In contrast, the amount of pellets supplied was found to decrease for relatively small pellets C (Example 13), compared with the example where no additive is added (Comparative Example 9) (refer to FIG. 20). The amount of pellets supplied was found substantially constant, regardless of the sizes of pellets, as is apparent from the amounts of supply concentrating in a relatively narrow area on the graph shown in FIG. 22.

In the cases where pellets of different sizes (pellets A and C) are mixed, the amount of supply for pellets having no additive added thereto (Comparative Example 10) is smaller than the mean value of the amount of supply of only pellets A (Comparative Example 4) and the amount of supply of only pellets C (Comparative Example 9) both having no additive added thereto. This demonstrates that the larger pellets with low supply performance have a dominant effect.

In contrast, even in the case where pellets of different sizes (pellets A and C) are mixed, the amount of supply in the example where 12HOS-Ca was added as an additive (Example 14) makes little difference from the amounts of supply in other Examples. This demonstrates that the amount of supply of pellets having 12HOS-Ca added thereto are stable.

From the results above, it was confirmed that a substantially constant amount of pellets can be supplied to the extruder by depositing 12HOS-Ca, serving as an additive, on the outer circumferences of pellets, regardless of different pellet sizes etc., and that adding 12HOS-Ca, serving as an additive, very effective in achieving stable supply of pellets and therefore, manufacturing a synthetic wood product of uniform quality.

Confirming Ease of Introduction (Clingability) to Screw of Extruder

Evaluation Method

If introduction (clinging) of pellets into between the tooth grooves of the screw is satisfactory and melted pellets flow smoothly at the inlet portion of the extruder in the extrusion apparatus described with reference to FIG. 17, then the power of the motor that drives the screw of the extruder decreases, reducing the amount of energy (specific energy) required to discharge molten resin per unit amount (e.g., 1 kg).

Therefore, the clingability of pellets to the screw can be obtained by measuring a change in the above-described specific energy.

Given this fact, specific energy (Esp) defined below was obtained by measuring the amount of discharge by the extruder and the power of the motor that drives the screw of the extruder, and changes in this specific energy seen when the pellets in the Examples and the Comparative Examples were used were compared to evaluate the clingability of the composite pellets of the present invention to the screw.

Here, specific energy (Esp) is obtained as follows:

$$Esp = KW/Q (kwh/kg)$$

where KW is energy required to drive the motor (kw) and Q is the rate of extruded molten resin (kg/Hr).

For measurement, the motor M in the feeder 14 provided in the extrusion apparatus shown in FIG. 17 was operated at a constant rotational speed of 30 min$^{-1}$.

Measurement Results

Measurement results of the above-described specific energy (Esp) are shown in Table 10 below.

TABLE 10

Measurement results of specific energy (Esp)

| Type of pellet | Additive | Added amount of additive (mass %) | | | | | | |
|---|---|---|---|---|---|---|---|---|
| | | 0 | 0.03 | 0.05 | 0.10 | 0.20 | 0.30 | 1.0 |
| | | Specific energy (Esp) | | | | | | |
| Pellets A | 12HOS-Ca | 0.22 | 0.20 | 0.18 | 0.15 | 0.15 | 0.15 | 0.15 |
| Pellets B | | 0.24 | 0.22 | 0.20 | 0.18 | 0.16 | 0.15 | 0.16 |
| Pellets C | | 0.25 | 0.24 | 0.20 | 0.18 | 0.17 | 0.17 | 0.16 |
| Pellets A + C (A/C = 1/1) | | 0.26 | 0.25 | 0.20 | 0.18 | 0.16 | 0.16 | 0.16 |
| Pellets A + C (A/C = 1/1) | st-Ca | 0.26 | 0.26 | 0.23 | 0.20 | 0.20 | 0.21 | 0.21 |

Figure 23:
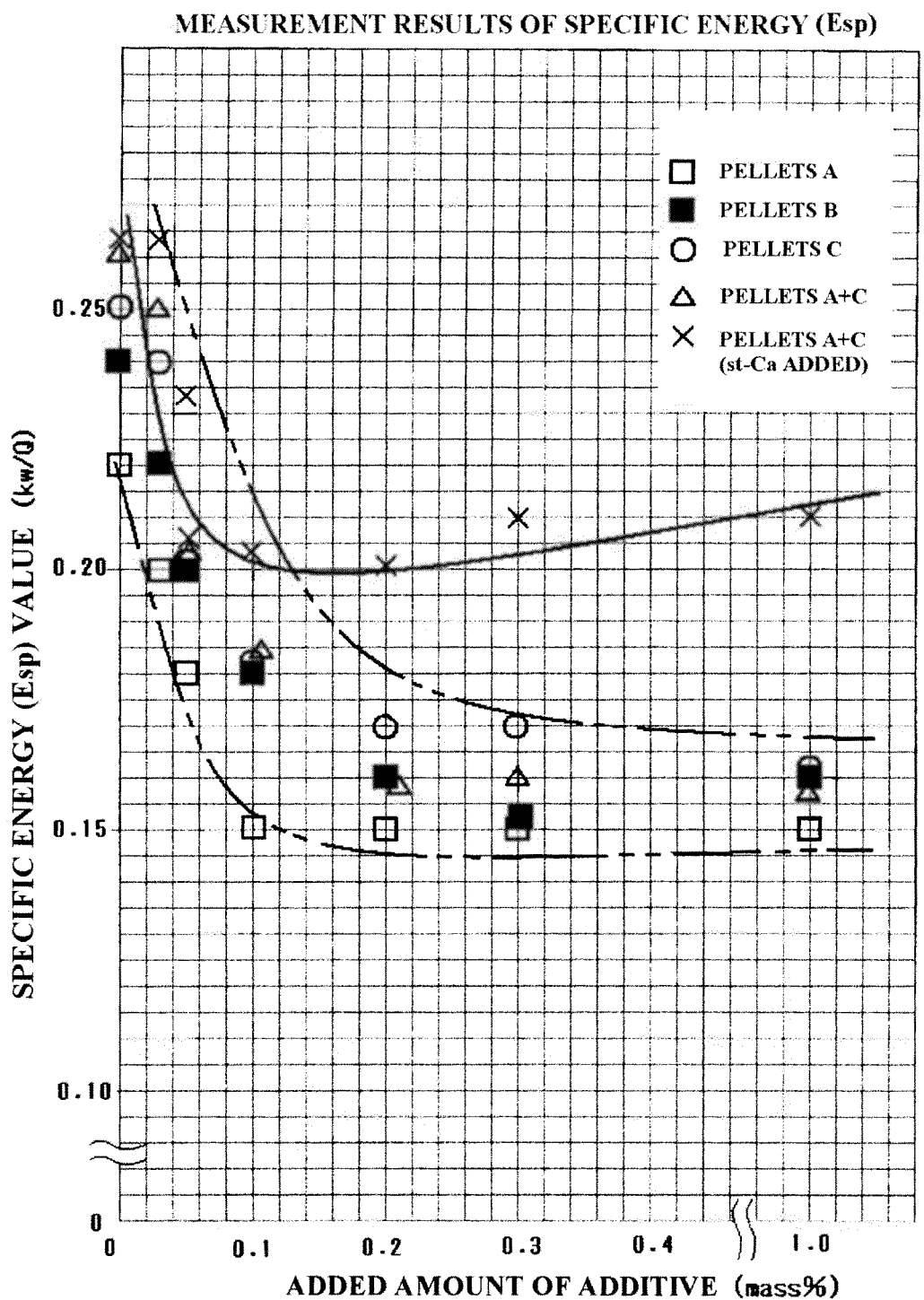
FIG. 23 is a graph showing the relationship between changes in added amount of an additive according to Embodiment 2 and changes in specific energy (Esp).

In addition, a graph of the measurement results shown in Table 10 is shown in FIG. 23.

Consideration of Results

From the results above, the specific energy (Esp) was found to decrease in the examples where 12HOS-Ca was added, compared with the cases where no additive was added, and this decrease in specific energy (Esp) was found to begin when about 0.03 mass % of 12HOS-Ca was added.

On the other hand, in the examples where a known st-Ca was added as an additive, addition of 0.03 mass % of st-Ca did not cause the specific energy (Esp) to decrease, and neither did a larger amount of st-Ca added cause the specific energy to decrease markedly. Thus, addition of 12HOS-Ca was found considerably effective in increasing the specific energy (Esp), and therefore the amount of clinging pellets.

In addition, regarding the above-described measurement results of the amount of supply (refer to Table 9), the amount of supply to the extruder decreases slightly with relatively small pellets C. However, taking into consideration the fact that adding 12HOS-Ca as described above caused the specific energy (Esp) to decrease, irrespective of a decrease in the amount of pellets supplied to the delivery opening 13*b* of the extruder, addition of 12HOS-Ca produces more than enough clingability to offset a decrease in the amount of supplied pellets.

As is apparent from the graph in FIG. 23, even when the added amount of 12HOS-Ca is increased to more than about 0.3 mass %, no significant decrease in specific energy (Esp) is seen, and addition of more than 0.4 mass % of 12HOS-Ca does not cause the specific energy (Esp) to decrease any further.

From the results above, it was confirmed that addition of 12HOS-Ca by amounts raging from 0.03 to 0.4 mass %, which is the predetermined value range according to the present invention, is effective in enhancing the clingability of pellets and that smooth melting and clinging of pellets are achieved in the extruder by adding such an additive.

Furthermore, such a decrease in specific energy (Esp) indicates that a synthetic wood product can be manufactured with a small amount of energy, and adding 12HOS-Ca by an amount falling within the predetermined value range according to the present invention was found to contribute to energy saving when a synthetic wood product is manufactured.

The following Claims do not cover appliances, devices, machines, apparatuses, steps, or methods achieved only by the specific means disclosed here. The above-described Claims are intended to protect the spirit or essence of this epoch-making invention. The present invention is clearly novel and useful.

Moreover, when the present invention is made, the present invention is not obvious to those persons of ordinary skill in the art with reference to the related art, and further, taking into consideration the nature of the present invention that brings about a revolutionary change, the present invention is clearly a pioneering invention to the relevant art. In legal respect, to protect the spirit of the present invention, the scopes of the following Claims should be interpreted considerably broadly.

Therefore, because the objects described above and clarified from the above descriptions are efficiently achieved, and a certain level of modifications can be made in the above-described structures without departing from the scope of the present invention, all contents in the above descriptions or the attached drawings should be subjected to not restrictive but explanatory interpretations. The following Claims are intended to cover all of the comprehensive and inherent characteristics according to the present invention described here, and it should be understood that in rhetorical aspect, all other expressions about the scope of the present invention are covered by the scope of the Claims.

DESCRIPTIONS OF REFERENCE NUMERALS

11 Extrusion apparatus
12 Extruder (screw type)
13 Cylinder
13*a* Outlet (of the cylinder 13)
13*b* Delivery opening (of the cylinder 13)
14 Feeder
14*a* Feeder (for composite pellets)
14*b* Foaming agent feeder
15 Screws (of the extruder 12)
16 Adapter 20 Extrusion die
20a Inlet (of the extrusion die 20)
20b Outlet (of the extrusion die 20)
21 Flow channel
22 Breaker plate
26 Resistor body
30 Molding die
33 Inlet portion
34 Heating section
35 Kneading section
36 Constant-amount supply section
40 Composite-pellet manufacturing apparatus
41 Feeder
42 Extruder
42a Cylinder
42b Screw
42c Screw element
43 Die nozzle
43a Nozzle holes
44 Cutter
44a Cutter blade
45 Centrifuge
47 Dryer
50 Collection machine
150 Tumbler mixer
151 Sealed container

What is claimed is:

1. A method of manufacturing composite pellets for extrusion in which the composite pellets are used as a molding material extruded into a synthetic wood product containing a thermoplastic resin and wood meal as main ingredients, comprising:
when the composite pellets are formed by extruding a molten material obtained by melt-kneading a raw material containing thermoplastic resin and wood meal with an extruder into a strand shape through many nozzle holes provided in a die nozzle mounted at a front end of the extruder, then cutting strands of the molten material at intervals of a predetermined length,
setting the rate of extrusion (Q) of the extruder, the diameter (D) of each of the nozzle holes, and the number (n) of the nozzle holes such that a linear velocity (vd) falls within a range of 12 to 50, wherein
vd=(Q×1000/3600)/[(D/20)$^2$π·ρm·n], where vd=linear velocity (cm/sec),
Q=rate of extrusion by the extruder (kg/Hr),
D=diameter of each nozzle hole (mm),
n=number of nozzle holes, and
ρm=density of molten resin (g/cm$^3$).

2. The method of manufacturing composite pellets for extrusion according to claim 1, wherein the pellets are stirred together with metal salt of 12-hydroxystearic acid to deposit the metal salt of 12-hydroxystearic acid on surfaces of the pellets.

3. The method of manufacturing composite pellets for extrusion according to claim 2, wherein 0.03 to 0.4 mass % of the metal salt of 12-hydroxystearic acid relative to the composite pellets as 100 mass % is deposited on the composite pellets.

4. The method of manufacturing composite pellets for extrusion according to claim 1 wherein a compounding ratio of the wood meal to the thermoplastic resin is 70-30 mass % to 30-70 mass %.

5. The method of manufacturing composite pellets for extrusion according to claim 1, wherein the molten material is introduced into the nozzle holes at 170 to 250° C.

6. The method of manufacturing composite pellets for extrusion according to claim 1, wherein the strands of the molten material are cut to a length of 2 to 5 mm.

7. Composite pellets for extrusion manufactured by the method according to claim 1.

8. The composite pellets for extrusion according to claim 7, wherein the composite pellets are used as a molding material for extrusion foam molding in which the molding material is delivered together with a foaming agent into a cylinder of the extruder provided in an extrusion apparatus for extruding into a synthetic wood product.

9. The composite pellets for extrusion claim 7 wherein the pellets contain a thermoplastic resin and wood meal as main ingredients and have metal salt of 12-hydroxystearic acid deposited as an additive on outer circumferences thereof.

10. The composite pellets for extrusion according to claim 9, wherein 0.03 to 0.4 mass % of the metal salt of 12-hydroxystearic acid relative to the pellets as 100 mass % is deposited on the pellets.

11. The composite pellets for extrusion claim 9, wherein the metal salt of 12-hydroxystearic acid contains any one of calcium (Ca), magnesium (Mg) or zinc (Zn) as metal.

12. The composite pellets for extrusion according to claim 9, wherein the metal contained in the metal salt of 12-hydroxystearic acid includes any of aluminum (Al), barium (Ba), lithium (Li), or sodium (Na).

13. The composite pellets for extrusion according to claim 7, wherein the pellets have a bulk density of 0.60 g/cm$^3$ or more when placed in a container with a predetermined capacity in a nonpressurized state.

14. The composite pellets for extrusion according to claim 7, wherein the compounding ratio of the thermoplastic resin to the wood meal is 70-30 mass % to 30-70 mass %.

15. The composite pellets for extrusion according to claim 7, wherein the thermoplastic resin is composed of one or both of polypropylene and polyethylene.

16. The composite pellets for extrusion according to claim 7, wherein the thermoplastic resin is waste plastic collected in a mixed state of two or more types of thermoplastic resins.

17. The composite pellets for extrusion according to claim 7, wherein the thermoplastic resin has a melt index (MI) within a range of 0.5 to 10 (g/10 min).

18. The composite pellets for extrusion according to claim 7, wherein the wood meal is composed of a waste material including a waste building material or sawdust greatened during wood processing.

19. The composite pellets for extrusion according to claim 7, wherein the grain size of the wood meal is within a range of 150 to 200 μm.

20. The composite pellets for extrusion according to claim 7, wherein the wood meal has a water content of 1 mass % or less.

21. The method of manufacturing composite pellets for extrusion according to claim 2, wherein a compounding ratio of the wood meal to the thermoplastic resin is 70-30 mass % to 30-70 mass %.

22. The composite pellets for extrusion according to claim 9, wherein the pellets have a bulk density of 0.60 g/cm$^3$ or more when placed in a container with a predetermined capacity in a nonpressurized state.

23. The composite pellets for extrusion according to claim 9, wherein the compounding ratio of the thermoplastic resin to the wood meal is 70-30 mass % to 30-70 mass %.

24. The composite pellets for extrusion according to claim 9, wherein the thermoplastic resin is composed of one or both of polypropylene and polyethylene.

25. The composite pellets for extrusion according to claim 9, wherein the thermoplastic resin has a melt index (MI) within a range of 0.5 to 10 (g/10 min).

26. The composite pellets for extrusion according to claim 9, wherein the grain size of the wood meal is within a range of 150 to 200 μm.

27. The composite pellets for extrusion according to claim 9, wherein the wood meal has a water content of 1 mass % or less.

* * * * *

UNITED STATES PATENT AND TRADEMARK OFFICE
CERTIFICATE OF CORRECTION

PATENT NO.         : 8,871,345 B2
APPLICATION NO.    : 13/641536
DATED              : October 28, 2014
INVENTOR(S)        : Takeyasu Kikuchi et al.

It is certified that error appears in the above-identified patent and that said Letters Patent is hereby corrected as shown below:

In the Specification,

Column 15, line 11, Please delete "121-HOS-M" and insert --12HOS-M--.

Signed and Sealed this
Seventeenth Day of March, 2015

Michelle K. Lee
*Director of the United States Patent and Trademark Office*

UNITED STATES PATENT AND TRADEMARK OFFICE
CERTIFICATE OF CORRECTION

Page 1 of 1

PATENT NO. : 8,871,345 B2
APPLICATION NO. : 13/641536
DATED : October 28, 2014
INVENTOR(S) : Takeyasu Kikuchi et al.

It is certified that error appears in the above-identified patent and that said Letters Patent is hereby corrected as shown below:

Title Page, item (63) Related U.S. Application Data, Please delete "which", and insert therefore --and--

Signed and Sealed this
Twenty-third Day of June, 2015

Michelle K. Lee
*Director of the United States Patent and Trademark Office*